(12) United States Patent
Schmierer et al.

(10) Patent No.: US 12,522,153 B2
(45) Date of Patent: Jan. 13, 2026

(54) VEHICLE MOUNTED DISPLAY UNIT AND VEHICLE THEREWITH

(71) Applicant: MOTHERSON INNOVATIONS COMPANY LIMITED, London (GB)

(72) Inventors: Arne Schmierer, Stuttgart (DE); Csaba Szilágyi, Stuttgart (DE); Volker Erhart, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 409 days.

(21) Appl. No.: 18/040,327

(22) PCT Filed: Aug. 16, 2021

(86) PCT No.: PCT/EP2021/072722
§ 371 (c)(1),
(2) Date: Feb. 2, 2023

(87) PCT Pub. No.: WO2022/034242
PCT Pub. Date: Feb. 17, 2022

(65) Prior Publication Data
US 2023/0356670 A1 Nov. 9, 2023

Related U.S. Application Data

(60) Provisional application No. 63/065,627, filed on Aug. 14, 2020, provisional application No. 63/065,606, filed on Aug. 14, 2020.

(30) Foreign Application Priority Data

Nov. 20, 2020 (DE) ............ 10 2020 130 777.2

(51) Int. Cl.
*B60R 11/02* (2006.01)
*B60R 16/02* (2006.01)
(Continued)

(52) U.S. Cl.
CPC ...... *B60R 11/0235* (2013.01); *B60R 16/0215* (2013.01); *B60N 3/026* (2013.01); *B60R 2011/0022* (2013.01)

(58) Field of Classification Search
CPC ............ B60R 11/0235; B60R 16/0215; B60R 2011/0022; B60R 11/02; B60R 2300/202; B60N 3/026
See application file for complete search history.

(56) References Cited

U.S. PATENT DOCUMENTS 5,647,607 A * 7/1997 Bolieau ............... B60R 21/216
280/728.2
6,158,793 A * 12/2000 Castro .................. B60R 11/02
224/548
(Continued)

FOREIGN PATENT DOCUMENTS

CA 2903966 C * 4/2023 ......... A61J 15/0003
CN 202163363 U 3/2012
(Continued)

OTHER PUBLICATIONS

Patent Cooperation Treaty, PCT/EP2021/072722, International Search Report and Written Opinion, Oct. 29, 2021.
CNIPA, Appl. 202180055704.7, First Office Action, Jun. 26, 2025.

*Primary Examiner* — Philip P. Dang
(74) *Attorney, Agent, or Firm* — Jones Day

(57) ABSTRACT

The present disclosure refers to a vehicle mounted display unit comprising a display frame; a display attached to the display frame; an electronic control unit (ECU) attached to the display frame; and a display adaptor attached to the display frame and acting as an attachment component; and at least one wire harness characterized in that the vehicle mounted display unit comprises a display cover and a display housing, wherein the display cover and the at least one wiring harness have two geometric configurations, one (Continued)

for the vehicle mounted display unit to be position left from the driver or passenger and one to be position right from the driver or passenger.

25 Claims, 21 Drawing Sheets

(51) Int. Cl.
 *B60N 3/02* (2006.01)
 *B60R 11/00* (2006.01)

(56) References Cited

U.S. PATENT DOCUMENTS

| | | | |
|---|---|---|---|
| 6,181,242 B1 | 1/2001 | Nguyen | |
| 6,216,927 B1* | 4/2001 | Meritt | B60R 11/0211 296/37.16 |
| 8,091,850 B2* | 1/2012 | Carnevali | B60R 11/0252 248/176.1 |
| 8,387,457 B2* | 3/2013 | Snider | B60R 16/0239 73/431 |
| 8,830,686 B2* | 9/2014 | Nomoto | H05K 5/0073 361/752 |
| 9,174,576 B2* | 11/2015 | Buley | B60Q 1/2692 |
| 9,211,864 B2* | 12/2015 | Hock | B60R 21/235 |
| 9,358,929 B1* | 6/2016 | Huebner | B60R 11/02 |
| 9,456,531 B2* | 9/2016 | Snider | H05K 9/0081 |
| 9,604,576 B2* | 3/2017 | Uken | H04N 23/54 |
| 9,950,655 B2* | 4/2018 | Angara | B60R 13/105 |
| 11,242,008 B2* | 2/2022 | Blank | B60R 1/12 |
| 2005/0252053 A1* | 11/2005 | Pena | G09F 21/042 40/591 |
| 2013/0256478 A1* | 10/2013 | Reda | F16M 13/022 224/275 |
| 2014/0285666 A1* | 9/2014 | O'Connell | B60R 1/28 348/148 |
| 2021/0245662 A1 | 8/2021 | Blank et al. | |
| 2023/0234507 A1* | 7/2023 | Pomparew | B60R 11/04 |

FOREIGN PATENT DOCUMENTS

| | | | | |
|---|---|---|---|---|
| CN | 105555612 A | | 5/2016 | |
| CN | 205951822 | | 2/2017 | |
| EP | 3837139 | | 6/2021 | |
| EP | 3058436 B1 | * | 12/2021 | B44F 1/00 |
| GB | 2324990 A | * | 11/1998 | B60R 1/0602 |
| WO | WO-2016094801 A1 | * | 6/2016 | G08G 1/167 |
| WO | WO-2020018965 A1 | * | 1/2020 | B60R 1/12 |

\* cited by examiner

VEHICLE MOUNTED DISPLAY UNIT AND VEHICLE THEREWITH

CROSS-REFERENCE TO RELATED APPLICATIONS

This application is a is a National Stage Entry of International Patent Application No. PCT/EP2021/072722, filed on Aug. 16, 2021, which claims the benefit of priority to each of German Patent Application No. DE 10 2020 130 777.2, filed on Nov. 20, 2020, U.S. Provisional Application No. 63/065,606, filed on Aug. 14, 2020, and U.S. Provisional Application No. 63/065,627, filed on Aug. 14, 2020, each of which is hereby incorporated by reference in its entirety for all purposes.

FIELD

The present disclosure relates to a vehicle mounted display unit comprising a display frame, a display attached to the display frame, an electronic control unit (ECU) attached to the display frame, a display adaptor attached to the display frame and acting as an attachment component and at least one wire harness. It also refers to a vehicle with such a vehicle mounted display unit.

In particular, the vehicle mounted display unit comprises a display cover and a display housing, wherein the display cover and the at least one wiring harness have two geometric configurations, one for the vehicle mounted display unit to be position left from the driver or passenger and one to be position right from the driver or passenger. The invention also provides an electromagnetic shield (EMC) adapter unit within a vehicle display unit; more specifically the adapter is adapted for cooling of an electronic control unit (ECU) and shielding for electromagnetic radiation emitted by the electronic control unit (ECU).

BACKGROUND

Vehicles are increasingly including electronic displays in vehicles for displaying images and information to drivers. These displays vehicle displays are mounted in many different locations inside and outside a vehicle including a right hand and a left hand version for different driving positions. Such systems are designed around to accommodate the entire display system to the specific driving side position. This causes a complexity of parts to manage during the design and manufacturing to accommodate two different mounting directions. Also, these display can be sensitive to electromagnetic energy generated by other vehicle components. A type of display unit for a vehicle includes an electronic control unit (ECU) which can generate unwanted electromagnetic radiations and frequencies causing negative effects for other sensitive electronics of the display assembly. A shielding component such as an electromagnetic shield (EMC) is often used to shield the ECU. The EMC shield component provides protection for the sensitive signal from external electromagnetic signals, or prevents a stronger signal from interfering with the surrounding electronics. The main function of the EMC shield component is to avoid the harmful damage caused due to radiation from the ECU of display unit of the vehicle.

The heat generated by the ECU in the display raises the operating temperature in the display housing and may also affect other temperature sensitive components. A heat sink is a way for electronics to cool but in a small component, the heat sink may have limitations on size and cooling potential.

Vehicle displays mounted in an interior of a vehicle need to consider safety requirements when the display may receive an excessive loading condition such as a crash. If the display receives an excessive force it may become a safety hazard in certain situations and mounting of the display should accommodate these forces to protect the display.

SUMMARY

It is the object of this disclosure to further develop the known vehicle mounted display unit to overcome the problems of the prior art. In particular, a display unit with minimal complexity due to driving position is to be provided.

This object is achieved by a display cover (140) and a wiring harness having two geometric configurations, one for the vehicle mounted display unit to be position left from the driver or passenger and one to be position right from the driver or passenger.

Embodiments of the present disclosure are described in the sub-claims 2 to 24.

Thus, a vehicle mounted display system according to one aspect of the present disclosure has a display cover and a display housing, wherein the display cover (and a related wiring harness) has two geometric configurations, one for the vehicle mounted display unit to be position left from the driver and one to be positioned right from the driver.

According to a further aspect of the present disclosure, the vehicle mounted display includes a display frame where the display frame has at least one cooling fin to provide heat dissipation for the system. The system also includes an electronic control unit (ECU) attached to the display frame with a shielding element mounted adjacent to the ECU, a display adaptor with a first and second insulating means attached to the display frame; and a display attached to the display frame. The attachment of the display to the display frame includes at least one fastener in the interior area of the display and the display frame.

The first and second insulating means are electrically non-conducting and the display adaptor is configured to function as a reference point system (RPS) for mounting the display unit to a vehicle. The light sensor assembly may include a light sensor and a light guide where the light guide is translucent. The vehicle mounted display may include at least one heat sink mounted proximate to the ECU to provide cooling for the ECU. The shielding element is an electromagnetic shield (EMC) to reduce radiation and electrical interference to and from the ECU. The display adaptor has two geometric configuration, one to be positioned left from the driver or passenger and one to be position right from the driver or passenger. In one embodiment the display adaptor has a right hand (RH) and a left hand (LH) drive configuration.

One general aspect includes a display frame where the display frame includes at least one cooling fin; an electronic control unit (ECU) attached to the display frame; an electromagnetic shielding element (EMC) adjacent to the ECU, a reference point system (RPS) display adaptor attached to the display frame with a first and a second electrically insulating means, a display affixed to the display frame and a light sensor assembly coupled to the display frame. The light sensor assembly includes a light sensor and a smoked glass light guide. The attachment of the display to the display frame includes at least one fastener in the interior area of the display and the display frame.

Another form for a vehicle mounted display unit includes a display frame with at least one cooling fin, an electronic control unit (ECU) attached to the display frame, an electromagnetic shielding element (EMC), where the electromagnetic shielding element is adjacent to the ECU; a reference point system (RPS) display adaptor attached to the display frame, where the display adaptor has a first and a second electrically insulating means. The vehicle mounted display unit also includes a display affixed to the display frame; and a light sensor assembly coupled to the display frame; where the light sensor assembly may include a light sensor and a smoked glass light guide. The attachment of the display to the display frame includes at least one fastener in the interior area of the display and the display frame.

It should be noted that the features set out individually in the following description can be combined with each other in any technically advantageous manner and set out other forms of the present disclosure. The description further characterizes and specifies the present disclosure in particular in connection with the Figures.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Figure 1:
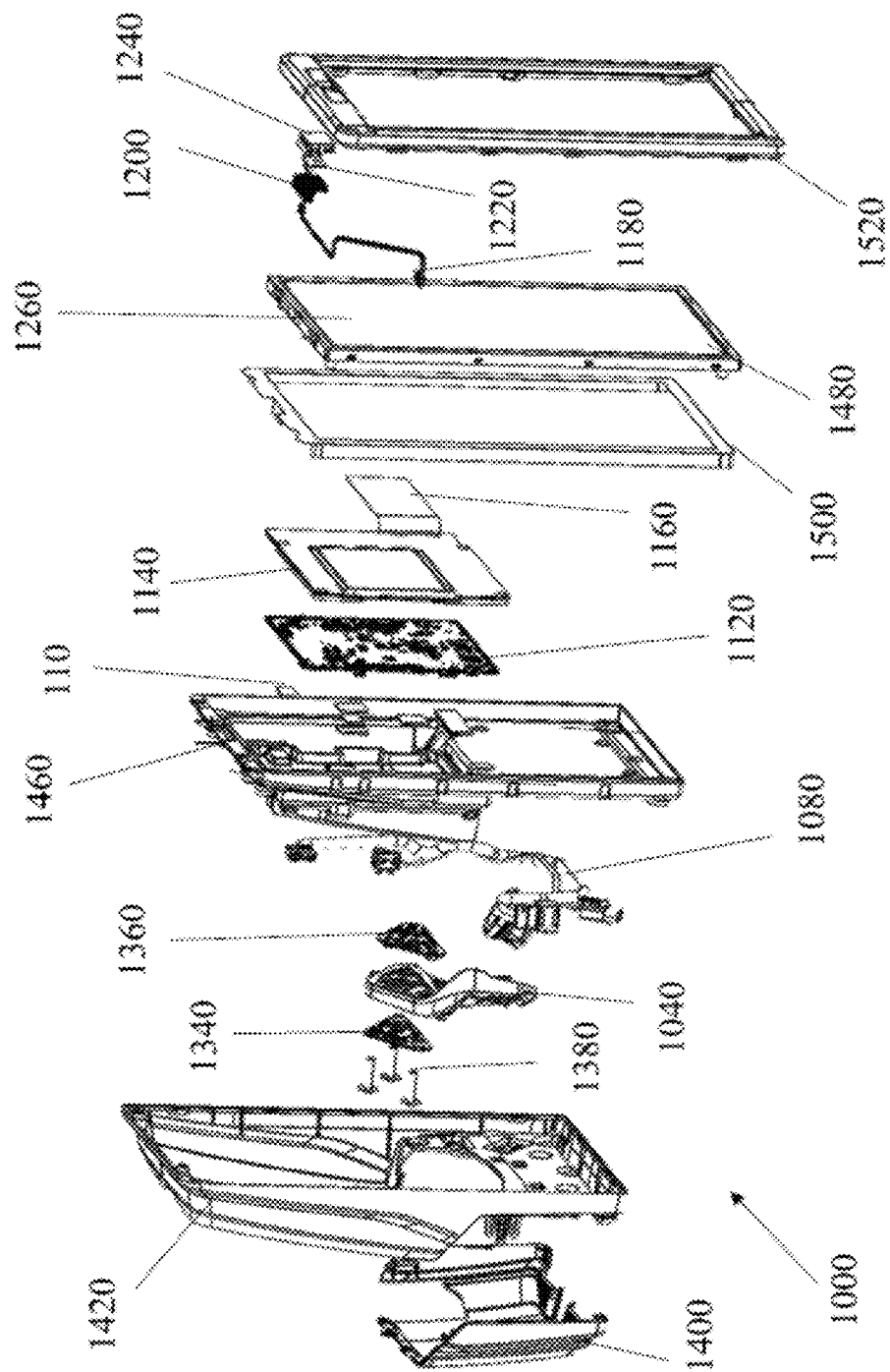
FIG. 1 illustrates an exploded view of a display unit for a vehicle according to the present disclosure.

The following description is merely exemplary in nature and is not intended to limit the present disclosure, application, or uses. It should be understood that throughout the drawings, corresponding reference numerals indicate like or corresponding parts and features.

FIG. 1 illustrates an exploded view of a display unit 1000. A display cover 1400 is operably coupled with a display housing 1420. In this form, the display cover 1400 is secured by a snap fit connection on a bottom side of the display housing 1420. The display cover 1400 may also be secured by other known fastening means. The display housing 1420 in cooperation with the display cover 1400 provides sealed cover for interior display components and protects interior components of the display unit 1000. The display cover 1400 may be designed to have two geometric configuration, one for a right hand driving vehicle and one for a left hand driving vehicle.

An display adaptor 1040 acting as an attachment means, engages with a first insulating means 1340 and a second insulating means 1360. The first and second insulating means 1340, 1360 are made from an electrically isolating material. In this form, the first and second insulating means 1340, 1360 have a triangular geometry which is configured to engage with the corresponding triangular portion of the display adaptor 1040 on opposing sides. The first and second insulating means 1340, 1360 are designed to provide electrical isolation between the display adaptor 1040 and the at least one fastener 1380. The second insulating means 1360 electrically isolates the display adaptor 1040 from a display frame 1460 when assembled. A non-conducting sleeve (not shown) may be further included in the display adaptor 1040 or the first and second insulating means 1340, 1360 to further electrically isolate the at least one fastener 1380 from the display adaptor 1040 when the display adaptor 1040 is assembled to the display frame 1460. In this form, three fasteners 1380 are used to attach the first insulating means 1340, the display adaptor 1040 and the second insulating means 1360 to the display frame 1460. The at least one fastener 1380 is a screw but may be any known fastener. It is within the scope of this disclosure that the first and second insulating means 1340, 1360 maybe be located in any location and have a different geometry or orientation to provide for electrical isolation for the display adaptor 1040. In another form, the first and second insulating means 1340, 1360 may provide for galvanic decoupling of the display adaptor 1040 from the display frame 1460 and the at least one fastener 1380.

A first wire harness 1080 is connected at a first end to a vehicle wiring harness 2140 (FIG. 3b) and at a second end to the display frame 1460 to provide a power supply, Controller Area Network (CAN) communication and micro switch signals to the display unit 1000. The first wire harness 1080 also contains a ground connected to an electronic control unit (ECU) 1120 and a shielding element 1140. The first and second insulating means 1340, 1360 electrically isolate the display adaptor 1040 from the ground and power supply provided to the display frame 1460 by the first wire harness 108. A grommet (not shown) is used to seal the wiring harness at a display frame opening (not shown) providing a containment seal for the display frame 1460.

Figure 3A:
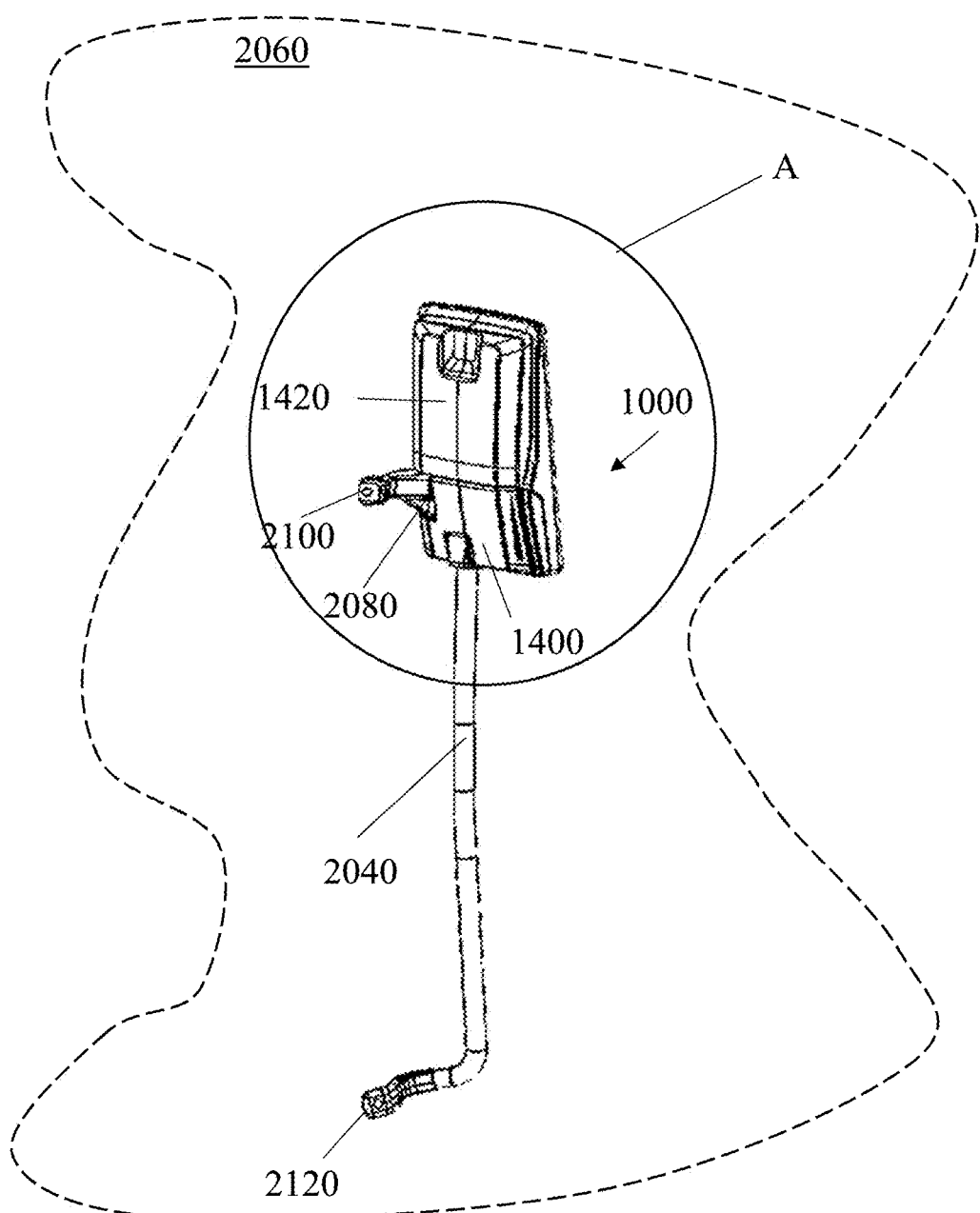
FIG. 3a illustrates a rear view of the display unit for the vehicle according to the present disclosure.

The display adaptor 1040 is configured to act as a reference point system (RPS) for mounting the display unit 100 to the vehicle surface 2060 (FIG. 3a). The display adaptor 104 illustrated in FIG. 1 has a LH driving geometry but the display adaptor 1040 also has a second part configuration which could be used for a RH driving geometry. The first variation is for a left hand (LH) driving configuration and a second variation is for mounting to a right hand (RH) driving configuration. The display cover 1400 and the first wiring harness 108 also have separate configurations for mounting in a RH or LH mounting location. In this form, a separate right hand (RH) and left hand (LH) driving configuration for the display cover 1400, the first wiring harness 108 and the display adaptor 104 creates less complexity for the display unit 1000. The display housing 1420 has features to accommodate both the left hand (LH) and the right hand (RH) driving configurations allowing the display housing to be used for either driving assembly configuration. In this form, mounting a LH or RH driving configuration can be accommodated by selecting a LH or RH version for the display adaptor 1040, the first wiring harness 1080 and the display cover 140. All other components shown in FIG. 1 for the display unit 1000 have a single part configuration for use in both the LH or the RH driving configurations.

In FIG. 1, the display unit 1000 includes a display frame 1460 configured to couple to an inside surface of at least one heat sink 1100. The at least one heat sink 1100 is designed to attach to an electronic control unit (ECU) 1120 and dissipate heat generated by the ECU 1120 and other components of the display unit 1000. The moderation of temperature improves the performance and longevity of the electrical components and the display unit 1000. In this form there are six individual heat sinks 1100 mounted for cooling of the ECU 1120 shown in the exploded view of FIG. 1. Each heat sink 1100 may have a unique size or configuration from other heat sinks 1100 in the display unit. The at least one heat sink 1100 mounts between the ECU 1120 and the display frame 1460. The display frame 1460 includes mechanically engaging fastener which retains the at least one heat sink 1100, the ECU 1120, and the shielding element 1140. In this form, the mechanically engaging fastener is a screw with a snap fit feature. However, it is within the scope of this disclosure for any fastener known in the art to be used to secure these elements to the display frame 1460.

A shielding element 1140 is configured to cover the display side of the ECU 1120. The shielding element 1140 is an electromagnetic shield (EMC) to guard against incoming or outgoing electromagnetic radiation emissions which may impact the performance of the display unit 1000. The shielding element 1140 may also provide additional sealing to reduce external contaminants such as dust particles from reaching the ECU 1120. A second wiring harness 1160 electrically connects to the ECU 1120. In this form, the second wiring harness 1160 is a flat wiring harness and conforms to the configuration of the shielding element 1140. The display frame 1460 may also incorporate electromagnetic shielding capabilities.

The display 1480 is generally planar, with the outer edge defining a display front surface 1260. The display front surface 1260 can be shaped to correspond to and fit within the shape of the viewing area of the display unit 1000. An adhesive 1500 may be used between the display 1480 and a display bezel 1520 or between the display 1480 and the display frame 1460. Any adhesive suitable for adhering the display bezel 1520 to the display 1480 may be used. In this form, the adhesive 1500 is an adhesive tape. The adhesive 1500 provides a seal which will protect the display unit 1000 from ingress of containments such as water and dust.

With reference to FIG. 1, a light sensor 1220, a light sensor cover 1200, a light guide 124, and a third wiring harness 118 form a light sensor assembly. The light sensor 1220 is located to receive ambient light and in this form the light sensor 1220 is a PCBA light sensor. Other light sensors may also be used. The light sensor cover 1200 in this form is constructed from a flexible thermoplastic elastomer (TPE). The light sensor 1220 is a snap-fit connection into the light guide 1240 where the light guide 1240 is designed to direct ambient light to the light sensor. One example of light detection by the light sensor 1220 is receiving an input light from a headlamp of a trailing vehicle. The input light received is used to determine a likely glare visible on the display front surface 1260. The likely glare may be calculated by algorithm in the ECU 1120 based on the input light received or it may be determined by a look-up table. The glare value is used to adjust settings for the display 1480 optimizing viewing of the display front surface 1260. The light sensor 1220 could also be an imager on a rear portion of the vehicle, wherein a signal representative of the received light is communicated from the light sensor 1220 to the display unit 1000. The light sensor assembly in this form is attached to the display bezel 1520 and indirectly coupled to the display frame 1420. In other variations the light sensor assembly may be attached to other component in the display 1000 or directly coupled to the display frame.

Figure 2:
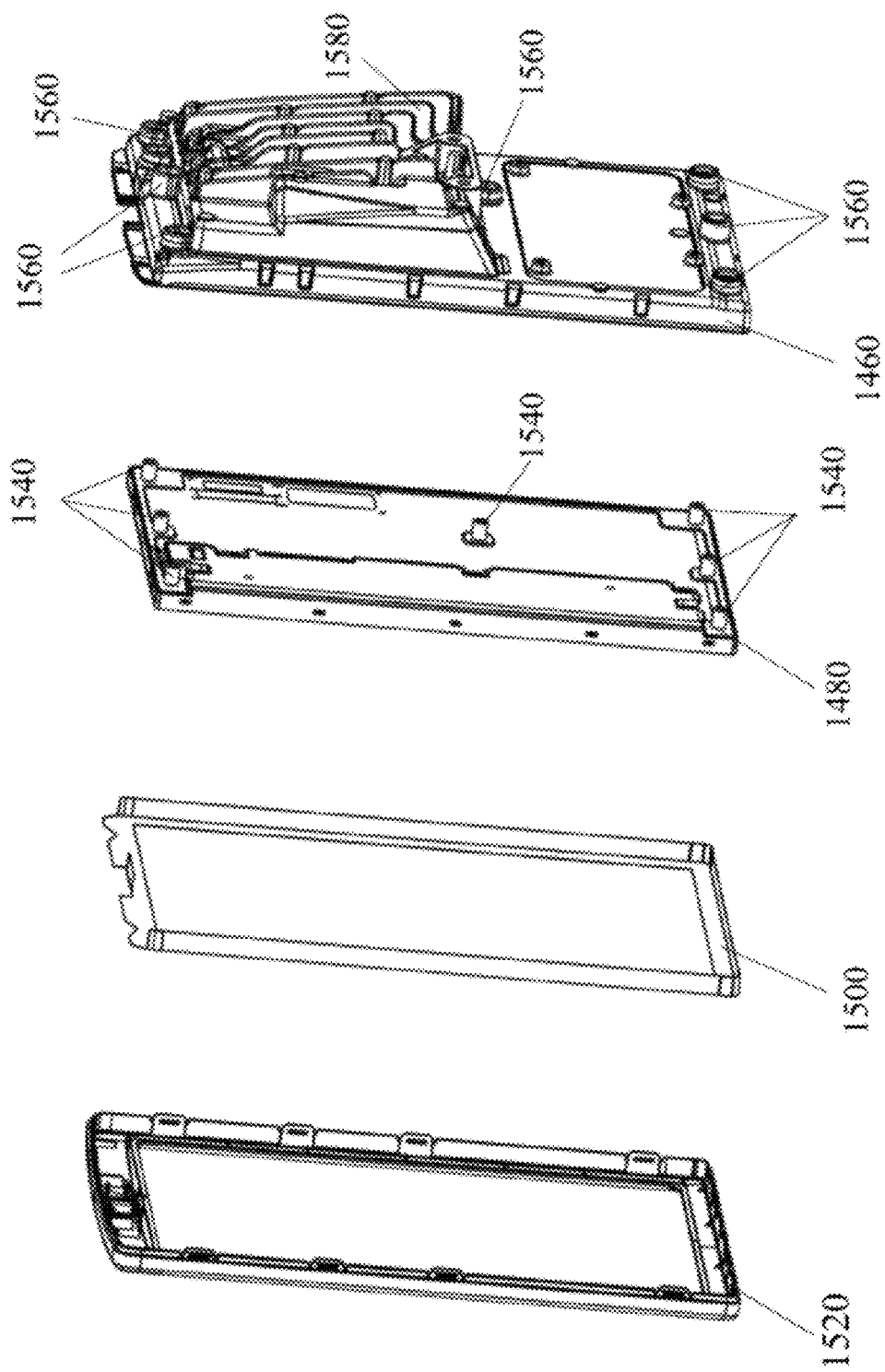
FIG. 2 illustrates an exploded view of the display attachment arrangement according to the present disclosure.

FIG. 2 illustrates the attachment configuration for the display frame 1460, the display 1480, the adhesive 1500 and the display bezel 1520. The display frame 1460 has at least two apertures 1560 for attaching the at least two mounting elements 1540 of the display 1480. At least one of the at least two apertures 1560 and the at least two mounting elements 1540 are located in the interior area of the display frame 1460 and display 1480. Fasteners (not shown) are inserted through the at least two apertures 1560 into the at least two mounting elements 1540. In this form there are seven fasteners such as a screw with seven corresponding mounting elements 1540 and apertures 1560 used for attaching the display 1480 to the display frame 1460. Six of the fasteners with corresponding mounting elements 1540 and apertures 1560 are located at the perimeter of the display frame 1460 and the display 1480. The seventh fastener with corresponding mounting element 1540 and aperture 1560 is located in the interior area of the display frame 146 and the display housing 1420 approximately in the center shown in FIG. 2. The fastener in this form is a screw but the fastener maybe any known fastener in the art to secure the display frame 1460 to the display 1480. Locating at least one of the at least two apertures 1560 and at least one of the at least two mounting elements 1540 in the interior of the display frame 1460 and the display 1480 provides for additional stiffness and stabilization reducing the stress and forces acting on the display 1480 during excessive loading that may occur for example in a crash event. The additional stiffness and stabilization of the display frame 1460 inhibits fracturing of the display front surface 1260 reducing the possibility of debris.

In FIG. 2, the display frame 1460 has at least one cooling fin 1580. The at least one cooling fin 158 increases the surface area of the display frame 1460 and thus provide for greater heat transfer and cooling for the display unit 1000. In this form, there are six cooling fins with a corresponding geometry to be inserted into the display housing 1420 but there may be more or less cooling fins depending on the cooling required. The geometry of the at least one cooling fin 1580 may also be varied to accommodate insertion into a display housing 1420 and provide cooling for the display unit 1000. The at least one cooling fin 1580 may also provide structural reinforcement to the display frame 1460. The display frame 1460 in this form is made of an aluminum or aluminum alloy but the material used for the display frame may be any material capable of providing thermal transfer and structural support such as other metal, metal alloys or metal reinforced plastics.

FIG. 3a illustrates the display unit 1000 with display housing 1420 and display cover 1400 attached on a vehicle surface 2060. The display unit 1000 utilizes attachment to an intermediate adapter 2080 to couple to a grab bar 2040. The intermediate adapter 2080 provides a first mounting member 2100 for mounting to the vehicle surface 2060. The grab bar 2040 is generally cylindrical and provides a second mounting member 2120 for attachment to the vehicle surface 2060. The vehicle surface 2060 may be in any vehicle mounting location within the scope of this disclosure. In this form, the vehicle surface 2060 is an interior mounting surface on a vehicle A-pillar. An area A is defined in FIG. 3a to illustrate the area shown in an enlarged view in FIG. 3b.

Figure 3B:
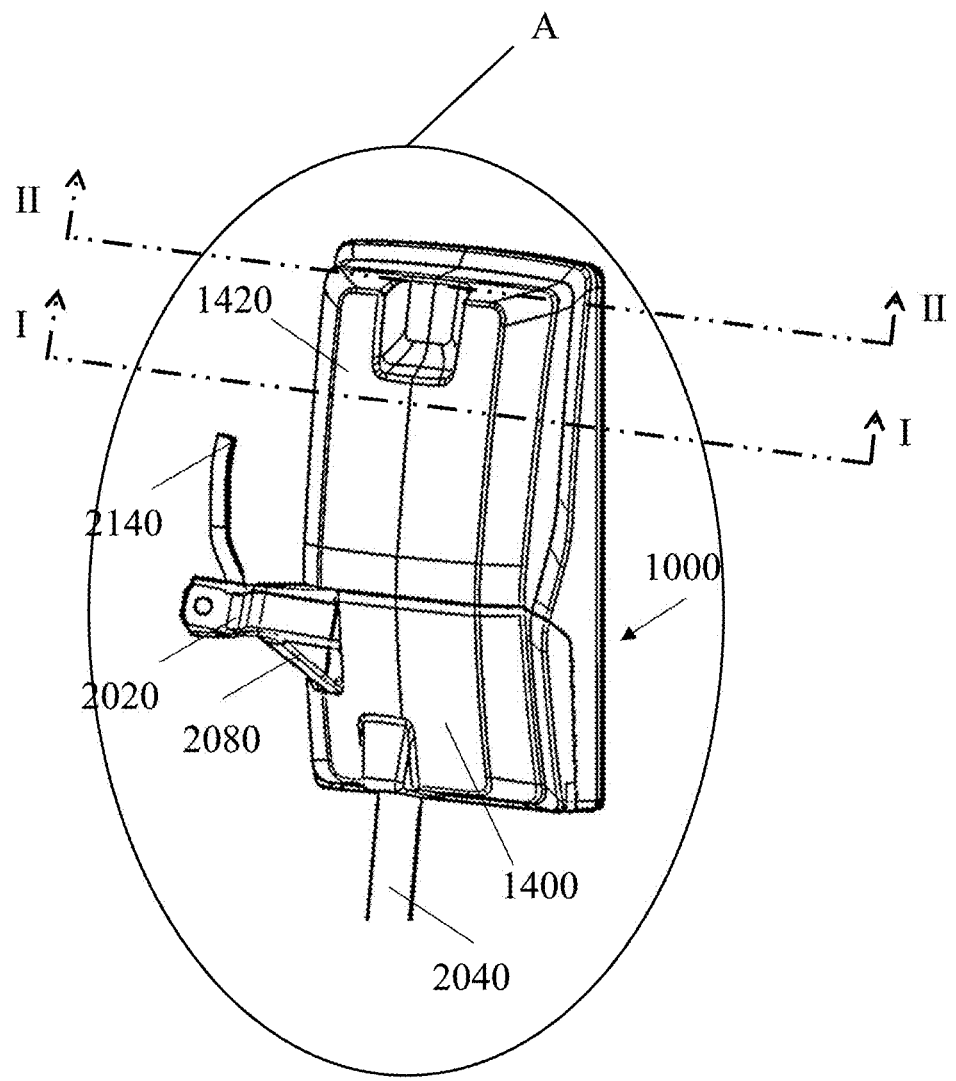
FIG. 3b illustrates an enlarged rear view of an Area A from FIG. 3a according to the present disclosure.

FIG. 3b illustrates an enlarged rear view of an area A from FIG. 3a. A retention strap 2020 is used in cooperation with the intermediate adapter 20800 for mounting the display unit 1000 to the vehicle surface 2060. The retention strap 2020 is made of steel and is design to restrain the display unit 1000 if a force exceeding design parameters is applied to the intermediate adapter 2080 such as in a crash situation. The retention strap 2020 in this form mounts between the intermediate adapter 2080 and the vehicle surface 2060. A vehicle wiring harness 2140 is shown which may connect with any of the first, second or third wiring harnesses (1080, 1160, 1180). The vehicle wiring harness 2140 may provide electrical power and data transfer to the display unit 1000. A section line I-I is shown in FIG. 3b for a sectional view illustrated in FIGS. 6-8. A section line II-II is defined for a section view illustrated in FIGS. 3a and 3b.

Figure 4:
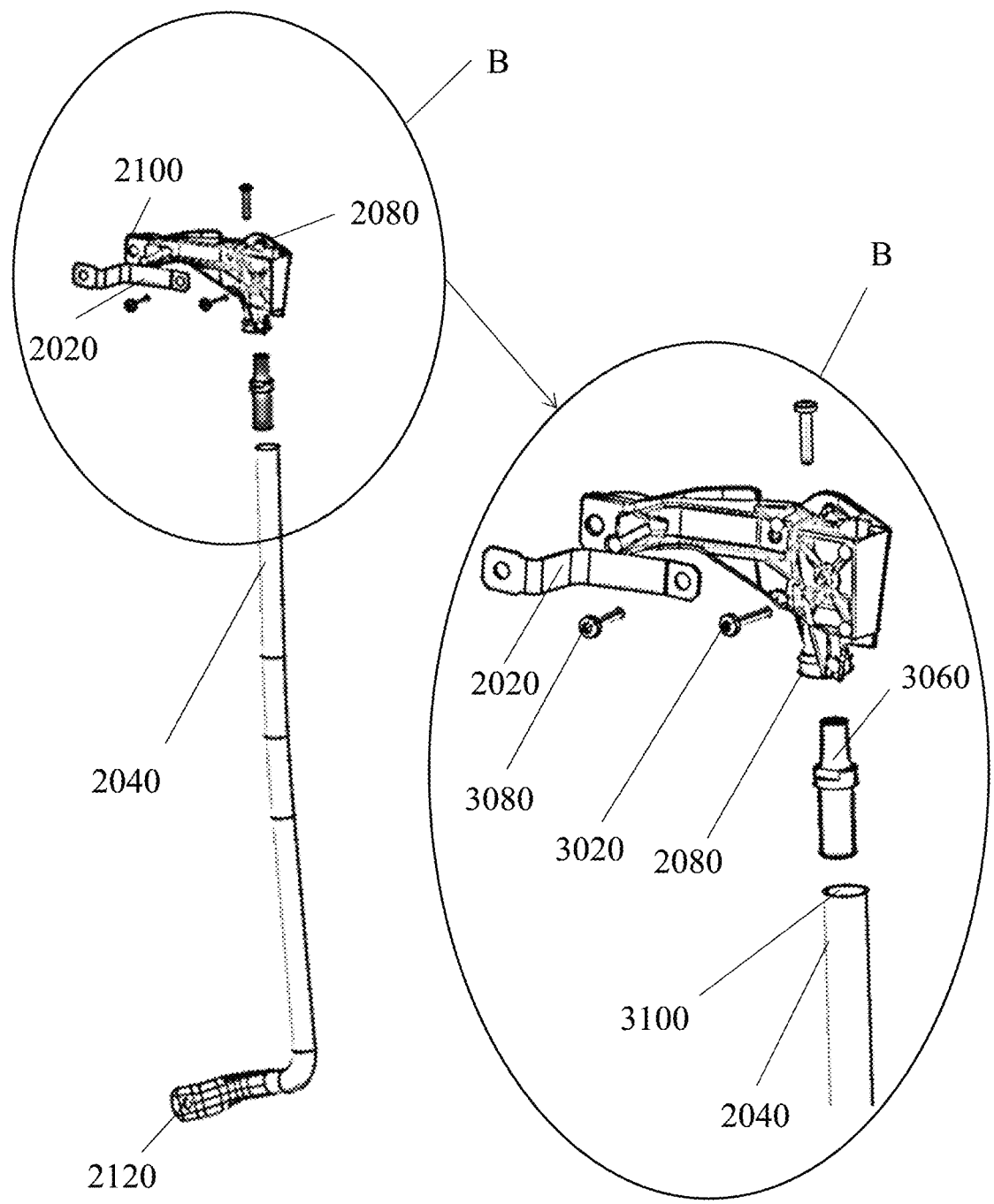
FIG. 4 illustrates an exploded view and an enlarged view of an Area B of an intermediate adapter configuration according to the present disclosure.

FIG. 4 illustrate the intermediate adapter 2080 and the retention strap 2020. An enlarged area B is shown to illustrate details of the intermediate adapter 2080. The retention strap 2020 is shown attached to the intermediate adapter with a fastener 308. In this form, a fastener 3020 couples the display adaptor 1040 (FIG. 1) to the intermediate adapter 2080. The cooperation of the display adaptor 1040 to the intermediate adapter 2080 provides mounting for the display unit 1000 to the vehicle surface 2060 (FIG. 3a). A connection member 3060 in this form is a steel material and is generally coextensive with the inner perimeter of the aperture 3100 of the grab bar 2040 at a distal end. The connection member cooperates with the intermediate adapter 2080 at a proximal end and at the distal end to the grab bar 2040 through aperture 3100, coupling the intermediate adapter 2080 to the grab bar 2040.

Figure 5:
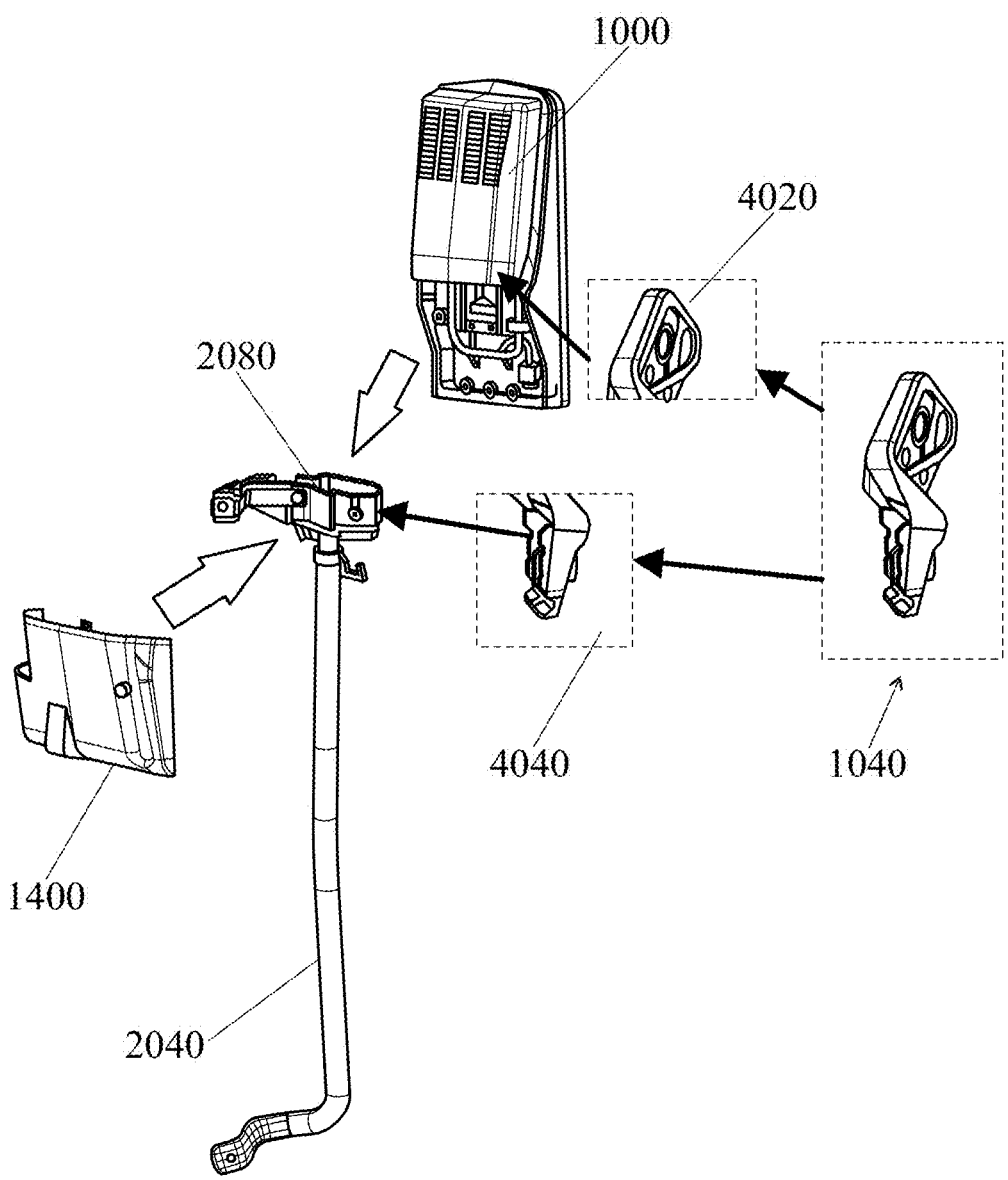
FIG. 5 illustrates an exploded view of a mounting arrangement for the display unit according to the present disclosure.

FIG. 5 illustrates an exploded view of the mounting arrangement for the display unit 1000 utilizing the display adaptor 1040. Display adaptor 1040 is illustrated in an upper section 4020 and a lower section 4040. The lower section 4040 of the display adaptor 1040 is attached to the intermediate adapter 2080 as described above in FIG. 4. The upper section 4020 of the display adaptor 1040 is configured to be attached with the first and second insulating means 1340, 1360 to the display frame 1460 as illustrated in FIG. 1. In this form, the upper section 4020 is attached to the display frame 1460 with at least one fastener 1380. The lower section 4040 of the display adaptor 1040 is coupled to the intermediate adapter 2080 through fastener 3020 (FIG. 4). The display adaptor 1040 provides coupling of the display unit 1000 to the intermediate adapter 2080. The intermediate adapter provides for mounting for the display unit 1000 to the vehicle surface 2060. FIG. 5 illustrates the LH configuration of the display adaptor 1040. The right hand configuration of the display adaptor 1040 also has an upper section and a lower section for mounting to the display frame 1460 and the intermediate adapter 2080. Once the display unit 1000 has been attached to the intermediate adapter 2080, the display cover 1400 is attached sealing the display unit and providing an external aesthetic appearance for the display unit 1000. In this form, the display cover 1400 is constructed from a polymer such as a plastic.

Figure 6:
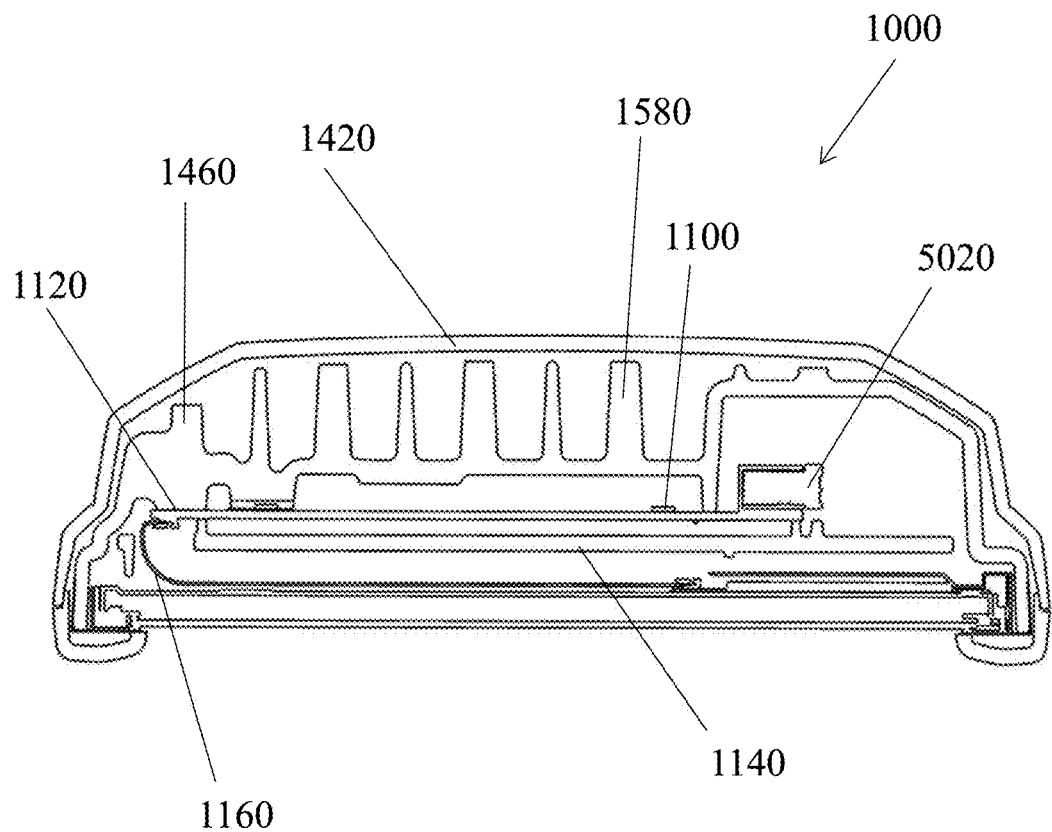
FIG. 6 illustrates a sectional view of the display unit from section I-I in FIG. 3b according to the present disclosure.

FIG. 6 illustrates a sectional view I-I of the display unit 1000 defined in FIG. 3b. The display housing 1420, display frame 1460, the at least one heat sink 1100, the ECU 1120, the shielding element 1140 and the second wiring harness 1160 are shown. The at least one cooling fin 1580 is illustrated in relation to the ECU 1120. The ECU 1120 is connected to the second wiring harness 1160 and in this form is generally planar as shown in FIG. 1. The at least one heat sink 1100 is placed adjacent to the ECU to provide cooling for electrical components mounted on the ECU 1120. A connector 5020 is an electrical connector for attaching the first wiring harness 108. The shielding element 1140 is placed adjacent to the ECU 1120 and provides EMC shielding of incoming and outgoing electromagnetic radiation emissions. The shielding element 1140 in this form is configured to complement the geometry of the ECU 1120 as shown in FIG. 1. The second wiring harness 1160 in this form is routed through an opening in the shielding element 1140.

Figure 7:
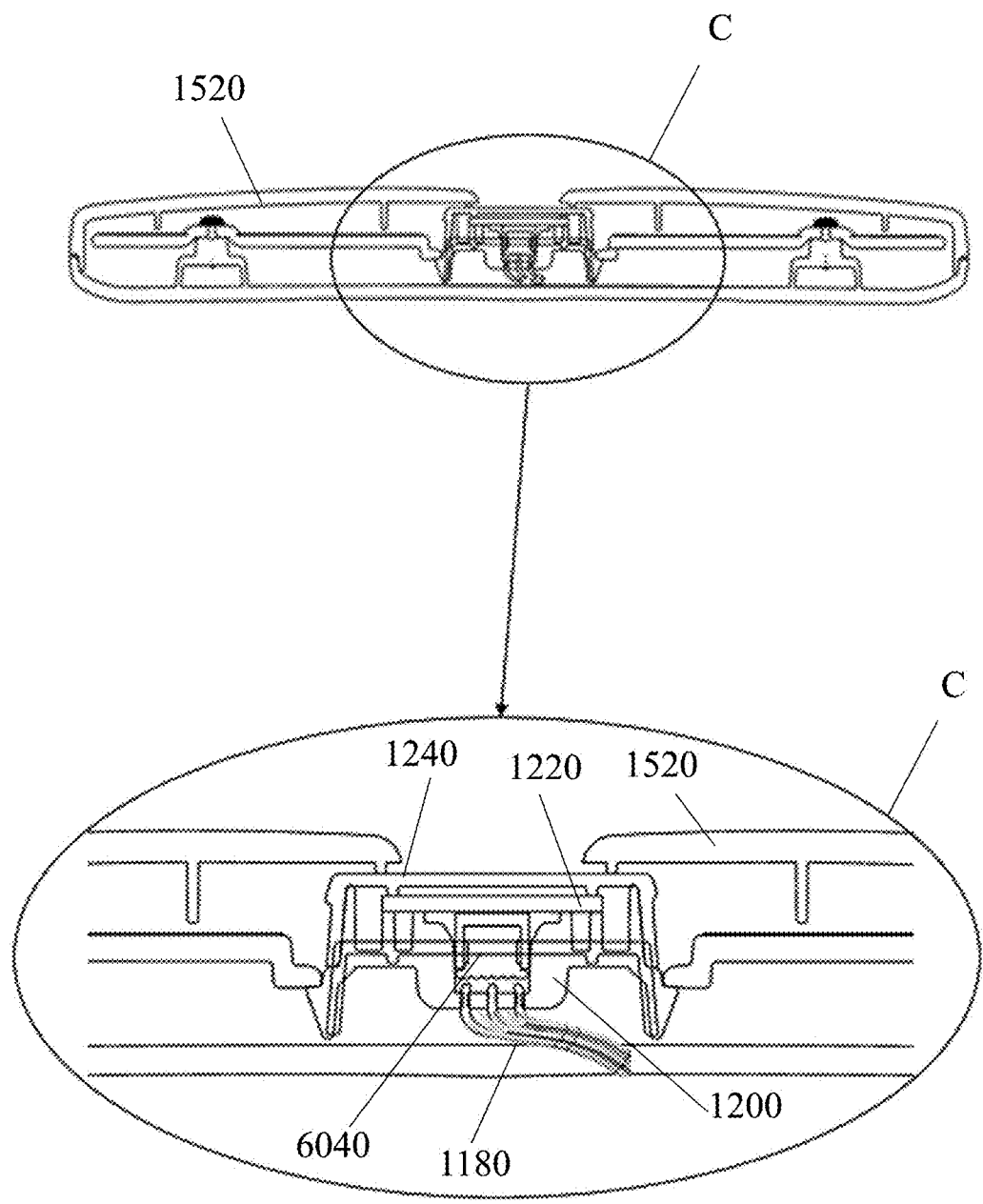
FIG. 7 illustrates a sectional view in whole and an enlarged view of an Area C of a light sensor assembly for the display unit for a vehicle according to the present disclosure.

FIG. 7 illustrates the sectional view of II-II of the display unit 1000 defined in FIG. 3b. An enlarged area C is provided for more details. The light guide 1240, the light sensor 1220, the third wiring harness 1180, the light sensor cover 1200 and an electrical connector 6040 are included in a light sensor assembly. The light sensor 1220 attaches to the light sensor cover 1200 and is arranged in the light sensor assembly to be visible from outside the display bezel 1520. A cutout in the display bezel 1520 allows for light to enter the light guide 1240. However, this cutout also allows the light sensor 1220 to be visible from the exterior. The visibility of the light sensor from the exterior of the display bezel 1520 can affect the aesthetics of the display unit 1000. The light guide 1240 in this form is a smoked glass which conceals the light sensor 1220 from an exterior view and provides a more aesthetically pleasing appearance of the display unit 100. The use of smoked glass for the light guide 1240 reduces the amount of ambient light which reaches the light sensor 1220. To offset the reduction in ambient light reaching the light sensor 1220, the ECU 1120 is calibrated to recognize and utilize the reduced light sensor input for the display functions such as reduction of glare on the display. The light sensor cover 1200 is a flexible material such as TPE.

Figure 8:
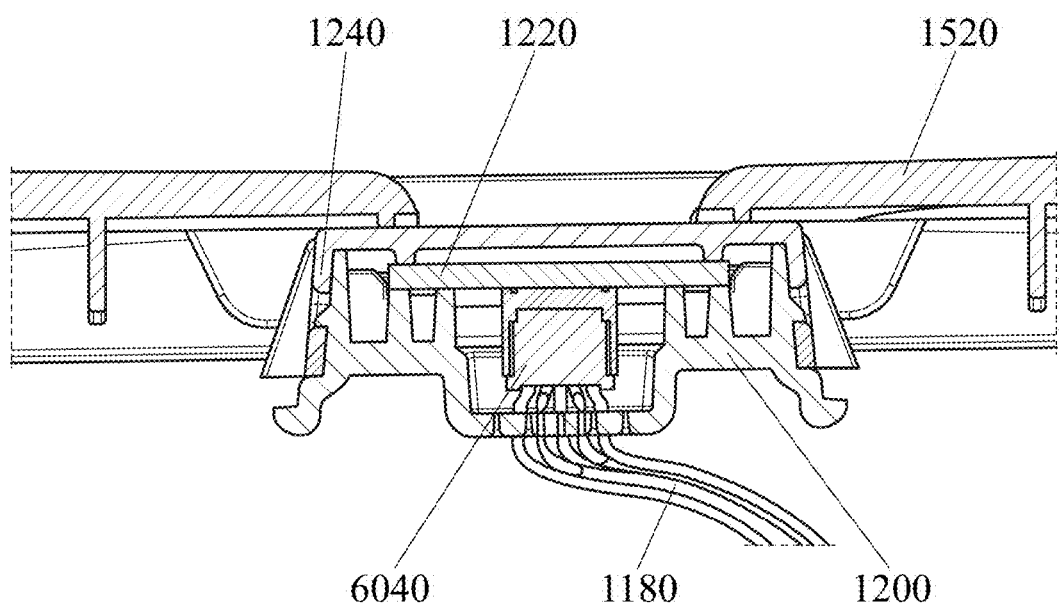
FIG. 8 illustrates second graphical representation of the sectional view of the light sensor assembly for the display unit according to the present disclosure.

FIG. 8 illustrates a second graphical representation of the sectional view of the light sensor assembly seen in FIG. 8 for the display unit 1000.

Figure 9:
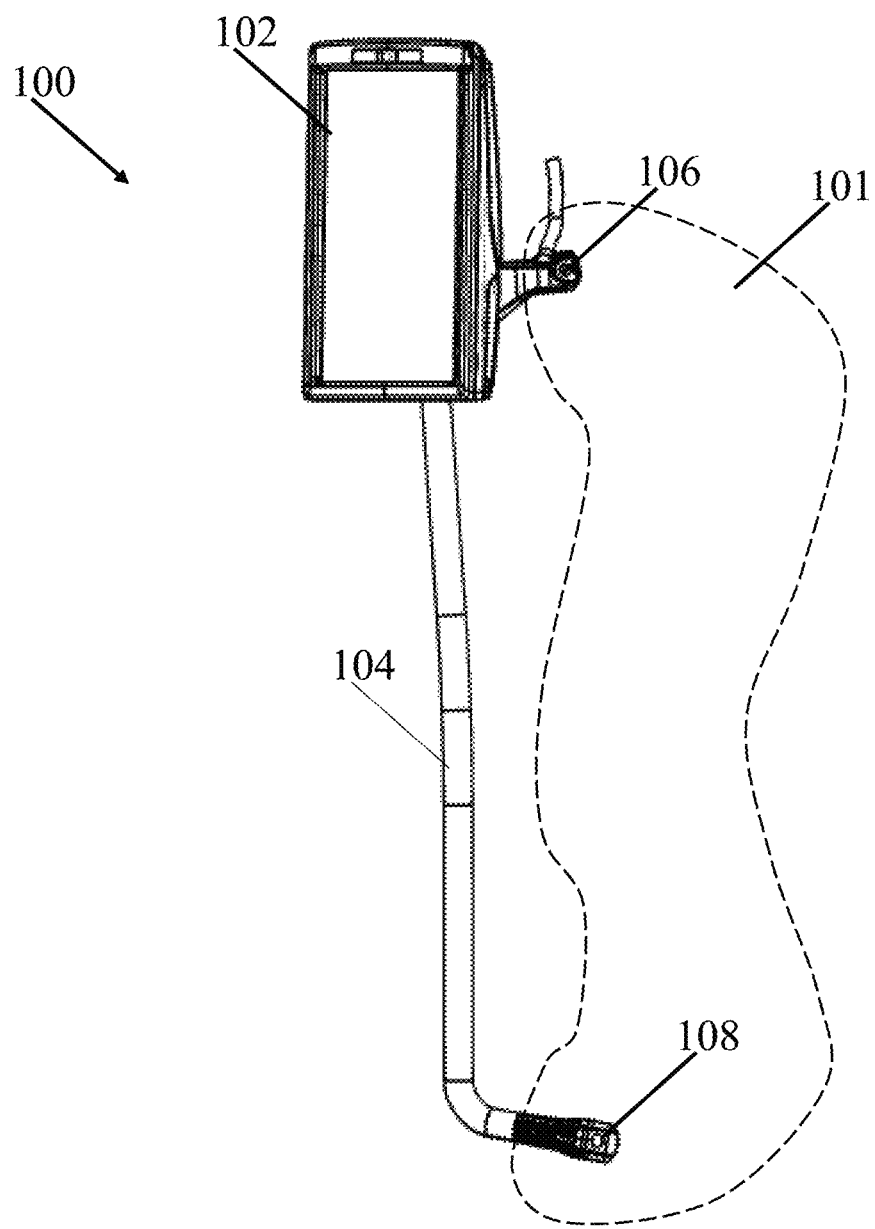
FIG. 9 depicts an isometric view of a vehicle display system.
Figure 10:
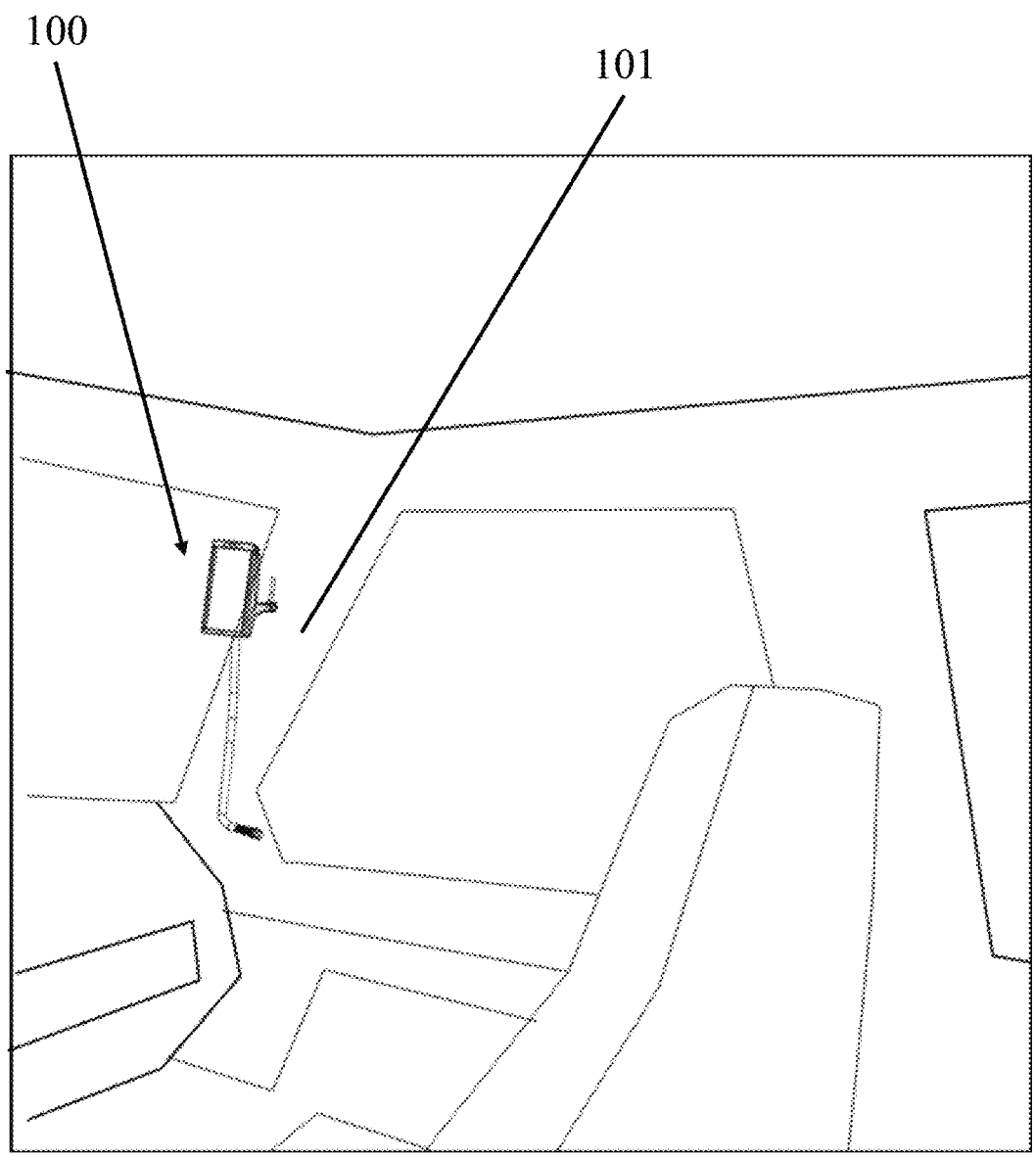
FIG. 10 depicts the vehicle display system mounted to the A-pillar of a vehicle.

FIG. 9 depicts an isometric view of another embodiment of the vehicle display system (100), which has to be read also in connection to the embodiments described above. The vehicle display system (100) includes a display unit (102) connected to a grab bar (104). The grab bar (104) is mountable to an A-pillar (101) of a vehicle via a first mounting member (106) and a second mounting member (108), and is intended to aid in facilitating the ingress and egress of a passenger from a cabin of the vehicle. A fastener, not shown, attaches the first mounting member (106) and the second mounting member (108) to the A-pillar (101) of the vehicle. Any fastener known within the art can be used and interchanged to mount the grab bar (104) to the A-pillar (101). In this form, a screw is the preferred fastener. FIG. 10 illustrates the vehicle display system (100) mounted to an inner surface of the A-pillar (101) of the vehicle. The vehicle display system (100) is able to be configured to mount to either the passenger side or driver side of a vehicle. In this form, the vehicle display system (100) is designed to easily adapt to mount to either side of the vehicle. It is also within the scope of this disclosure the display system 100 may also be mounted to other locations in the vehicle.

Figure 11:
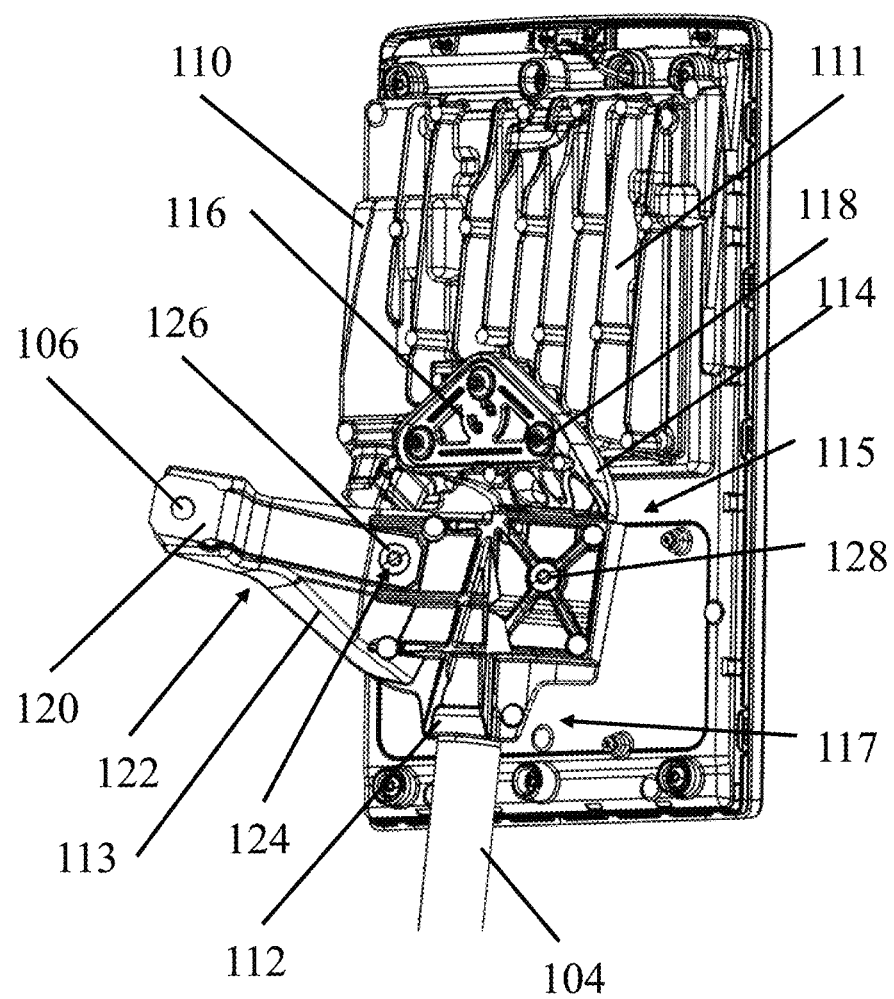
FIG. 11 depicts an isometric view of a vehicle display retention assembly.
Figure 12:
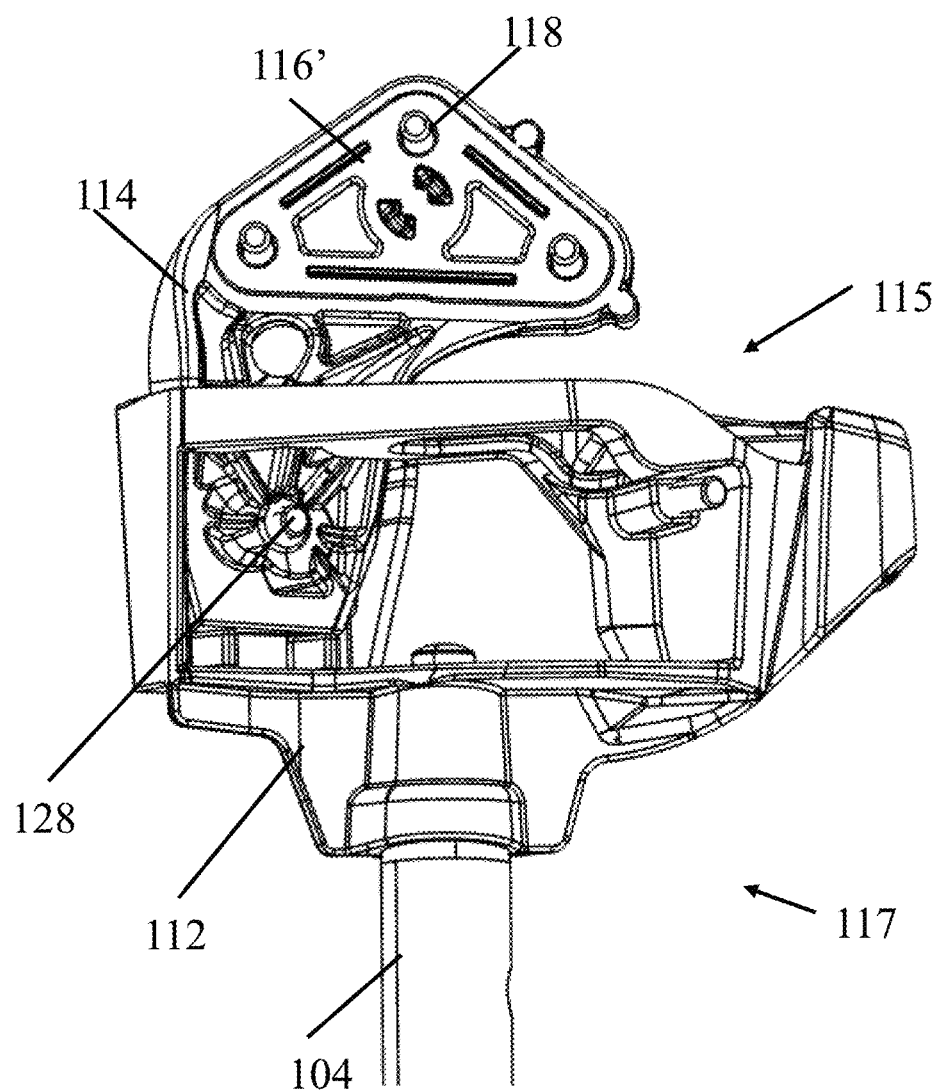
FIG. 12 depicts a front perspective view of a vehicle display retention assembly.

FIG. 11 shows an isometric view of the vehicle display retention assembly. The display unit (102, FIG. 9) affixes to a display frame (110). The display frame (110) includes at least one rib member (111) along its' back surface to facilitate the heat transfer and cooling of the display unit. The rib member (111) may also be designed to facilitate the dampening and transfer of forces from the display unit (102, FIG. 9) to the vehicle. The display frame (110) is coupled to an attachment component (114) via at least one display fastener (118). In this form, there is a series of three display fasteners (118) in a triangular formation. In other variations there may be more or less display fasteners (118) to suit the design requirements. The display fasteners (118) may be any known fastening device within the art that achieves the design considerations. In this form, the preferred display fastener (118) is a screw. Between the display fastener (118) and the attachment component (114) is a first insulating element (116). There is a second insulating element (116') between the attachment component (114) and the display frame (110). This relationship is best seen in FIG. 12. The first insulating element (116) and the second insulating element (116') acts to prevent electrical interference and/or thermal conductance to the attachment component (114). It also serves to provide vibration dampening within the vehicle display retention assembly. The first and second insulating elements (116, 116') may be any insulating material known in the art. In this form, the first and second insulating element (116, 116') is made of a rubber material, however the first and second insulating element (116, 116') may be any insulating material known in the art to meet electrical and thermal requirements.

The attachment component (114) is coupled to an intermediate adapter (112), which couples to the grab bar (104). The intermediate adapter (112) and the attachment component (114) serves to facilitate the connection between the display frame (110), the grab bar (104), and the A-Pillar (101, FIG. 9). In this form, the intermediate adapter (112) couples to the attachment component (114) at a proximal end (115), and couples to the grab bar (104) at a distal end (117). In between the proximal end (115) and the distal end (117) the intermediate adapter (112) includes a mounting arm (113). The mounting arm (113) includes the first mounting member (106) which facilitates the attachment of the grab bar (104) to the A-pillar (101, FIG. 9). Coupled between the mounting arm (113) and the A-pillar (101, FIG. 9) is a retention strap (120). In this form, the retention strap (120) is a steel material with a width between 5 mm and 30 mm, preferably being 20 mm. In other variations, the material and width of the retention strap (120) may change to suit the design requirements. The goal of the retention strap (120) is to retain the display unit (102, FIG. 9) in the event the mounting arm (113) is damaged in an impact scenario.

The mounting arm (113) protrudes from the intermediate adapter (112), and the retention strap (120) couples to the mounting arm (113) at the first mounting member (106) and at a retention member connection point (124). At the retention member connection point (124), the retention strap (120) is fastened to the mounting arm (113) via a retention strap fastener (126). In this form, the retention strap fastener (126) is designed to be a screw. In other variations the retention strap fastener (126) may be any other known fastener in the art to satisfy the design considerations. The retention strap (120) is intended to ensure the display frame (110) is retained in the event the loading condition on the mounting arm (113) exceeds the designed upper limit. In this scenario, the intermediate adapter (112) is designed to fail along the mounting arm (113) at a given fracture point (122). The fracture point (122) is located between the first mounting member (106) and the retention member connection point (124). If the applied force exceeds the design limit, the intermediate adapter (112) fails at the fracture point (122), the retention strap (120) is engaged and ensures the vehicle display system (100, FIG. 9) remains attached to the A-pillar (101, FIG. 9) of the vehicle at the first mounting member (106). This ensures the display frame (110) and the attached display unit (102, FIG. 9) does not move about the vehicle cabin in the event of an impact scenario.

FIG. 12 depicts a front perspective view of the vehicle display retention assembly. The intermediate adapter (112) is coupled to the grab bar (104) at a distal end (117). At the proximal end (115) the intermediate adapter (112) is coupled to the attachment component (114) via an attachment component fastener (128). The attachment component (114) is coupled to the second insulating element (116'), which rests between the attachment component (114) and the display frame (110, FIG. 11), inhibiting electrical interference and/or thermal conductance from the attachment component (114) to the display frame (110, FIG. 11).

Figure 13:
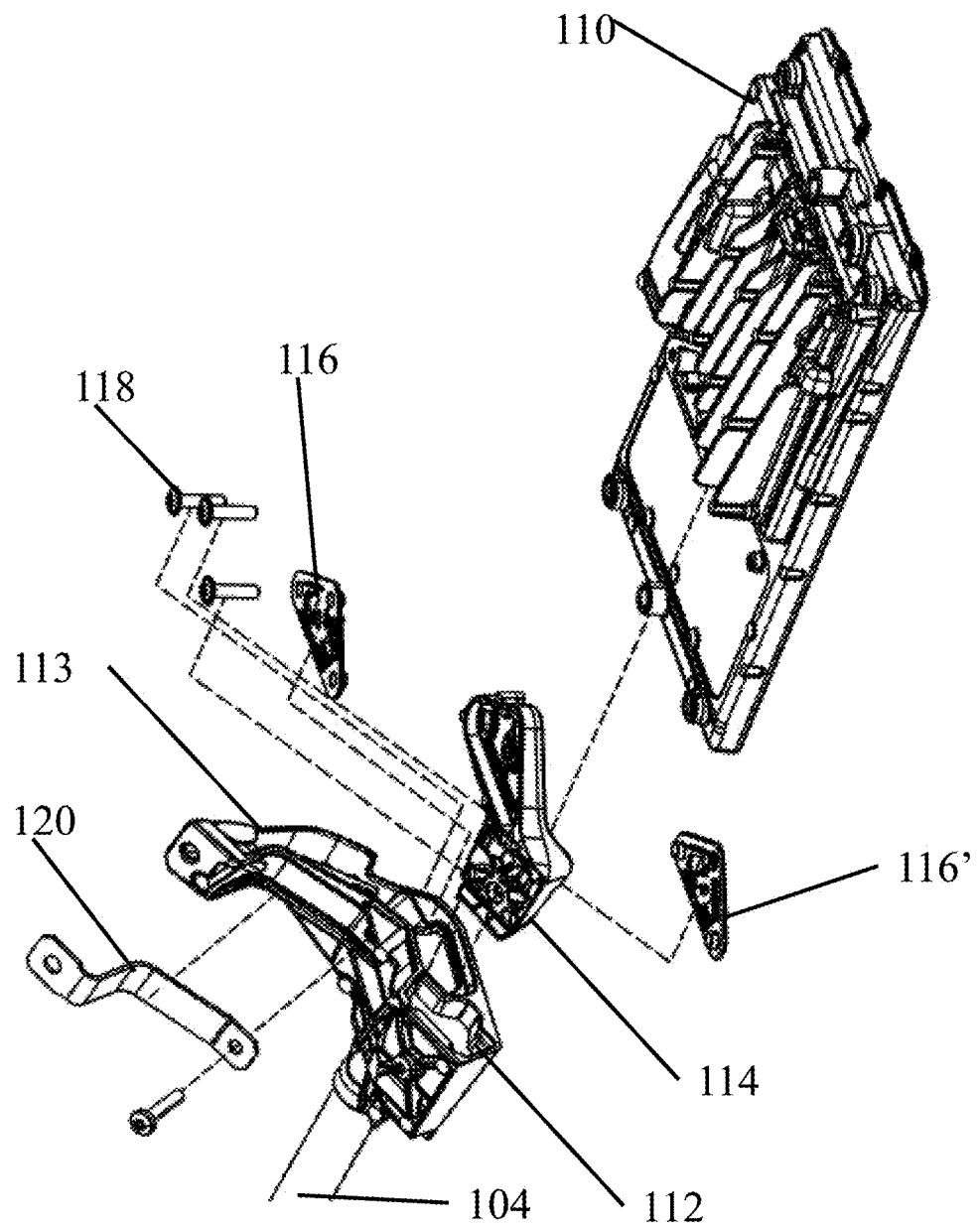
FIG. 13 depicts an exploded view of a vehicle display retention assembly.

FIG. 13 depicts an exploded view of the vehicle display retention assembly. This view is intended to show the relationship between the various components within the vehicle display retention system. As shown, and previously stated, the grab bar (104) is coupled to the intermediate adapter (112). The intermediate adapter (112) includes a mounting arm (113). Attached to the mounting arm (113) is a retention strap (120). The retention strap (120) is nestled within a groove of the mounting arm and coupled to the mounting arm (113) at two points. Coupled to the intermediate adapter (112) is the attachment component (114). The attachment component (114) is coupled to the first and second insulating element (116, 116'). The first insulating element (116) is coupled to the top of the attachment component (114), and the second insulating element (116') is coupled to the bottom of the attachment component (114). The first and second insulating elements (116, 116') are coupled to the attachment component (114) via the display fasteners (118) as shown. The display fasteners (118) also couple the display frame (110) to the attachment component (114). As shown in this form, the display fasteners (118) pass through the first insulating element, the attachment component (114), the second insulating element (116') to secure these components to the display frame (110).

Figure 14:
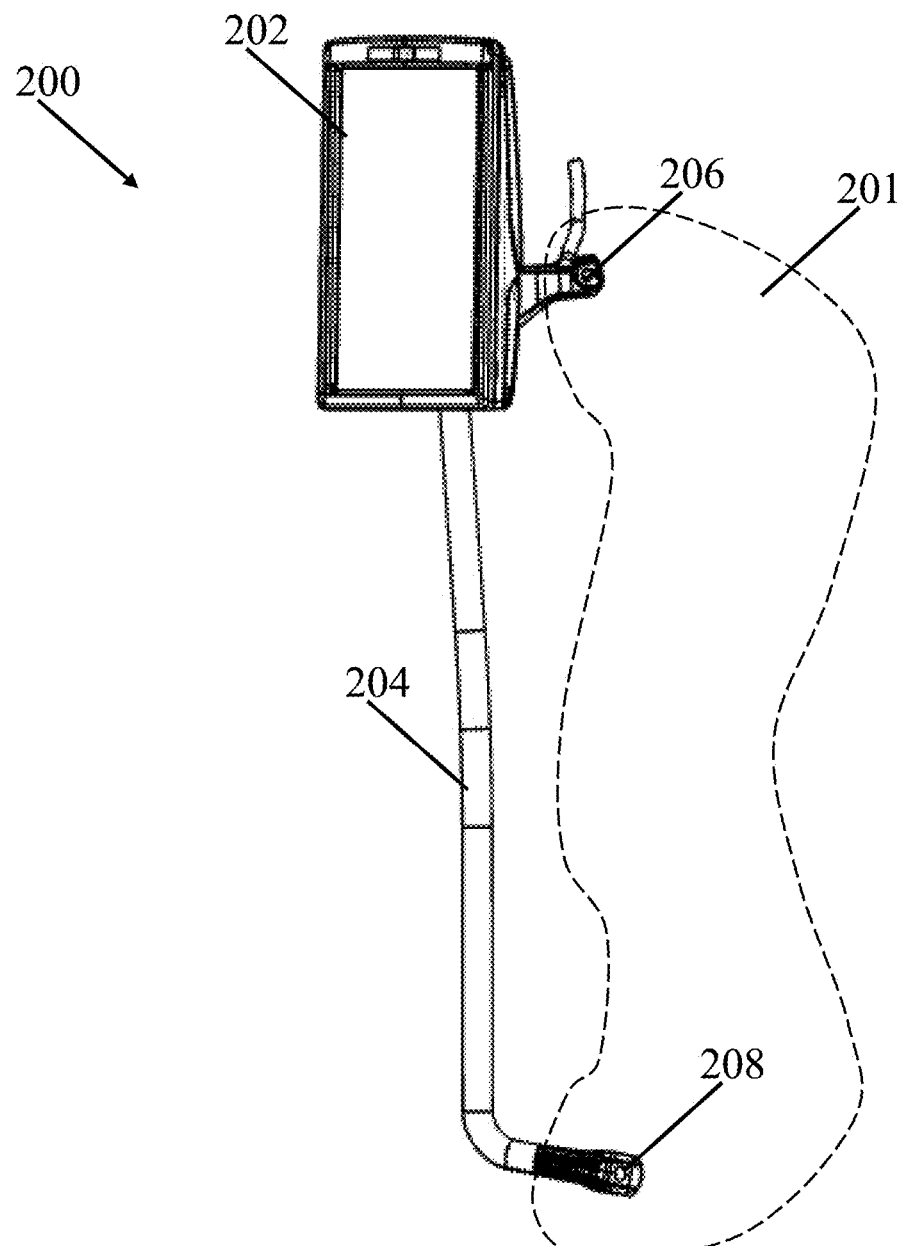
FIG. 14 depicts an isometric view of an alternate variation of a vehicle display system.

FIG. 14 depicts an isometric view of an alternate variation of a vehicle display system (200). The vehicle display system (200) in FIG. 14 externally looks similar to the vehicle display system (100) in FIG. 17. Internally, however, the vehicle display system (100, FIG. 17) and the vehicle display system (200) have distinct differences. The vehicle display system (200) includes a display unit (202) connected to a grab bar (204). The grab bar (204) is mountable to an A-pillar (201) of a vehicle via a first mounting member (206) and a second mounting member (208), and is intended to aid in facilitating the ingress and egress of a passenger from a cabin of the vehicle. A mounting fastener (225), shown in FIG. 17, attaches the first mounting member (206) to the A-pillar (201) of the vehicle. Another mounting fastener (225), not shown, attaches the second mounting member (208) to the A-pillar (201) of the vehicle. Any fastener known within the art can be used and interchanged to mount the grab bar (204) to the A-pillar (201). In this form, a screw is the preferred fastener.

Figure 15:
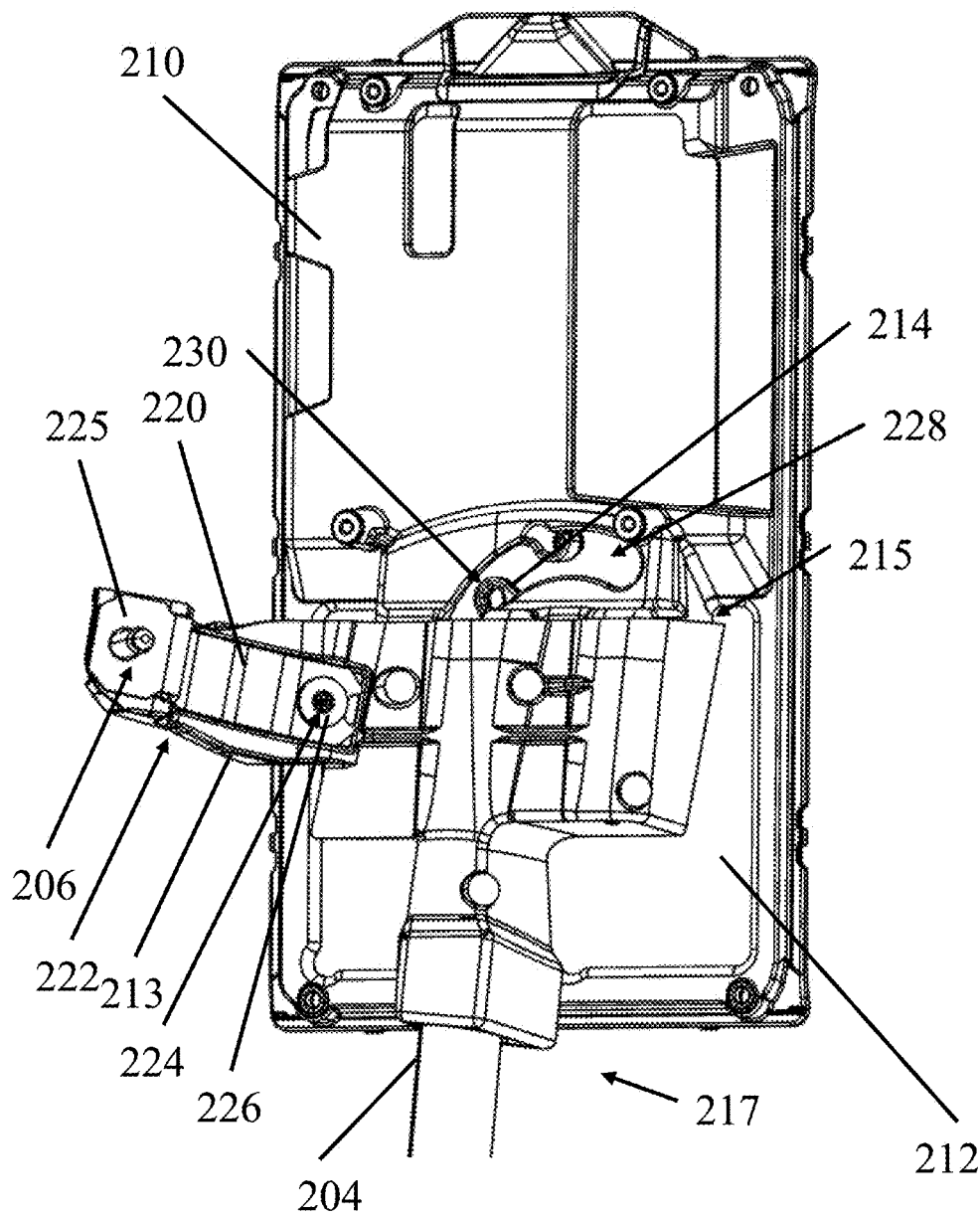
FIG. 15 depicts a rear perspective view of an alternate variation for a vehicle display retention assembly.

FIG. 15 shows a rear perspective view of the alternate variation of the vehicle display retention assembly. The display unit (202, FIG. 15) affixes to a display frame (210). The display frame (210) is coupled to an attachment component (214) via at least one display fastener (218), seen in FIG. 19. The attachment component (214) includes a guiding aperture (230) which is configured to receive a guiding element, not shown, and aligns with a guiding slot (228) in the display frame (210). The guiding element cooperate with the guiding slot (228) and the guiding aperture (230) to align the attachment component during assembly.

The intermediate adapter (212) is coupled to the attachment component (214) and the grab bar (204). The intermediate adapter (212) and the attachment component (214) serves to facilitate the connection between the display frame (210), the grab bar (204), and the A-Pillar (201, FIG. 14). In this form, the intermediate adapter (212) couples to the attachment component (214) at a proximal end (215), and couples to the grab bar (204) at a distal end (217). In between the proximal end (215) and the distal end (217) the intermediate adapter (212) includes a mounting arm (213). The mounting arm (213) includes the mounting member (206) which facilitates the attachment of the grab bar (204) to the A-pillar (201, FIG. 14). Coupled between the mounting arm (213) and the A-pillar (201, FIG. 14) is a retention strap (220). In this form, the retention strap (220) is a steel material with a width between 5 mm and 30 mm, with it preferably being 20 mm. In other variations, the material and width of the retention strap (220) may change to suit the design requirements. The goal of the retention strap (220) is to retain the display unit (202, FIG. 14) in the event the mounting arm (213) is damaged in an impact scenario.

The mounting arm (213) protrudes from the intermediate adapter (212), and the retention strap (220) couples to the mounting arm (213) at the first mounting member (206) and at a retention strap connection point (224). At the retention member connection point (224), the retention strap (220) is fastened to the mounting arm (213) via a retention member fastener (226). In this form, the retention member fastener (226) is designed to be a screw. In other variations the retention member fastener (226) may be any other known fastener in the art to satisfy the design considerations. The retention strap (220) is intended to ensure the display frame (210) is retained in the event the loading condition exceeds the designed upper limit. In this scenario, the intermediate adapter (212) is designed to fail along the mounting arm (213) at a given fracture point (222). The fracture point (222) is located between the first mounting member (206) and the retention strap connection point (224). If the applied force exceeds the design limit, the intermediate adapter (212) fails at the fracture point (222), the retention strap (220) is engaged and ensures the vehicle display system (200, FIG. 14) remains attached to the A-pillar (201, FIG. 14) of the vehicle at the first connection point (206). This ensures the display frame (210) and the attached display unit (202, FIG. 14) does not move about the vehicle cabin in the event of an impact scenario.

FIG. 14 shows a front perspective view of the alternate variation of the vehicle display retention assembly. The display frame (210) is coupled to the attachment component (214) via a display fastener (218, FIG. 18). The attachment component (214) cooperates with the intermediate adapter (212) to retain the display frame (210) to the intermediate adapter (212). The attachment component (214) includes a securing element (234) that cooperates with a stopping surface (232) of the A-pillar (201) of the vehicle. The securing element (234) hooks on the stopping surface (232) to prevent the dislocation of the attachment component (214) from the intermediate adapter (212).

Figure 16:
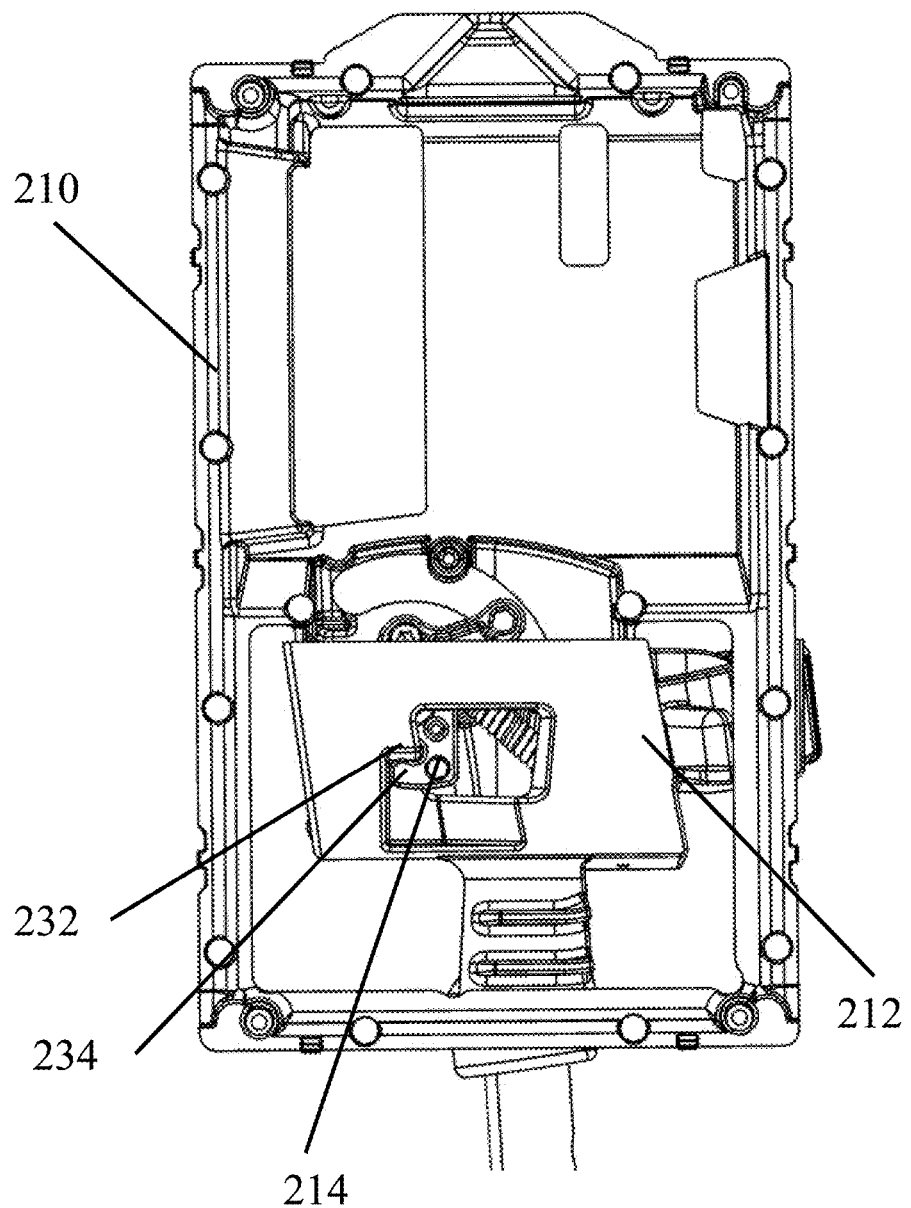
FIG. 16 depicts a front perspective view of an alternate variation for a vehicle display retention assembly.
Figure 17:
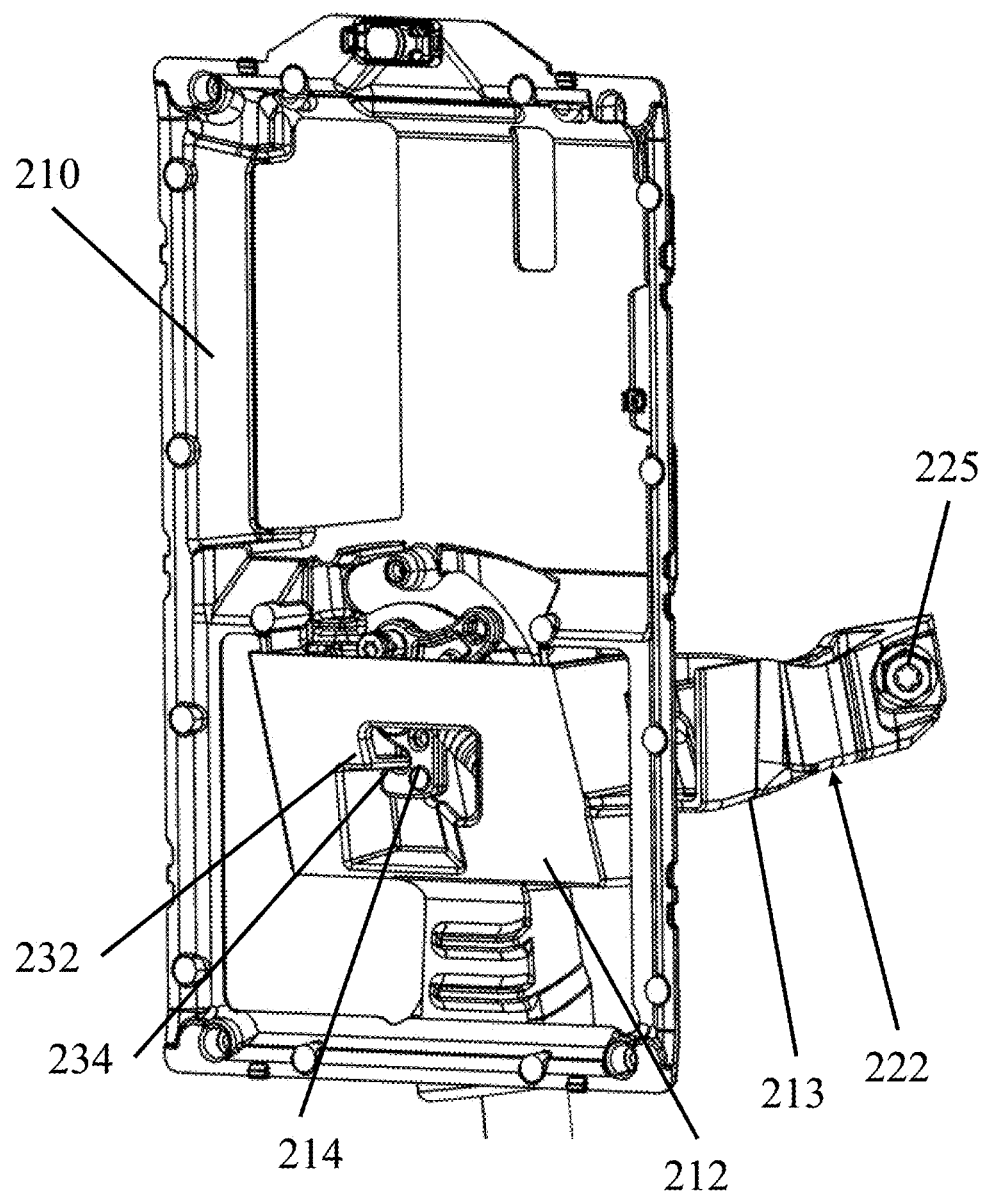
FIG. 17 depicts an isometric view of an alternate variation for a vehicle display retention assembly.
Figure 18:
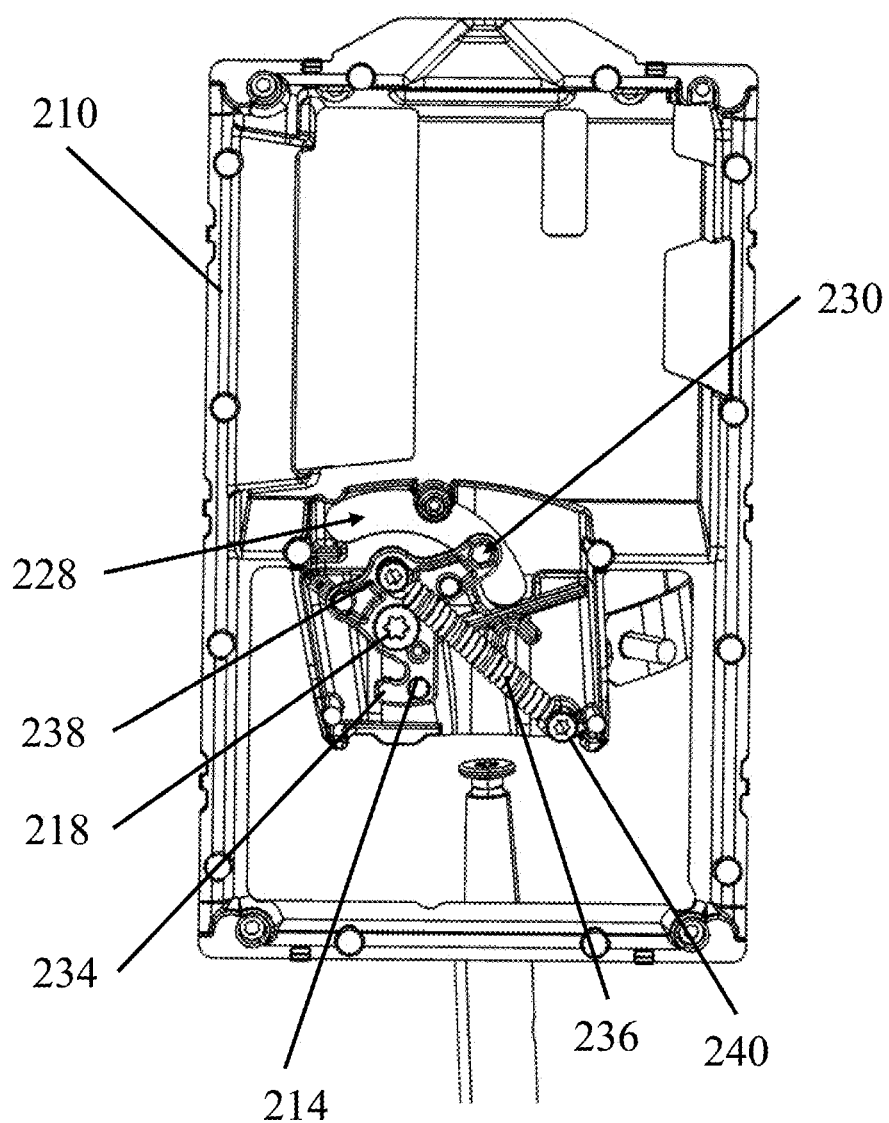
FIG. 18 depicts a front perspective view of an alternate variation for a vehicle display retention assembly with the intermediate attachment removed.
Figure 19:
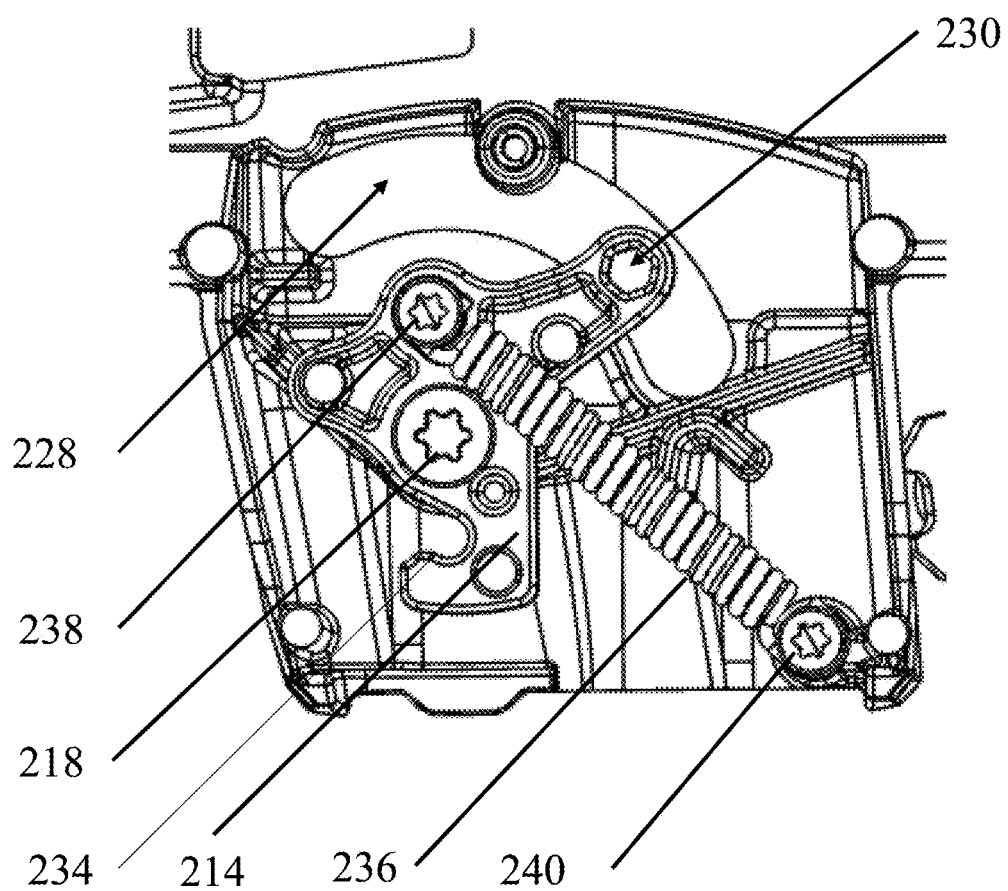
FIG. 19 depicts an isolated front perspective view of an alternate variation for a vehicle display retention assembly with the intermediate attachment removed.

FIG. 17 illustrates an isometric view of the alternate variation of the vehicle display retention assembly. A wall forms the stopping surface (232) of the intermediate adapter (212). The securing element (234) cooperates with the stopping surface (232) to facilitate the connection between the attachment component (214) and the intermediate adapter (212). FIG. 17 also illustrates the fracture point (222) of the mounting arm (213). When the loads on the system reach a given threshold the mounting arm (213) is designed to fail along the fracture point (222). The vehicle display system (200, FIG. 15) remains attached to the A-pillar (201, FIG. 15) via the retention strap (220, FIG. 16) and the mounting fastener (225), FIG. 18 and FIG. 19 illustrate a front perspective view of the alternate variation of the vehicle display retention assembly with the intermediate adapter (212, FIG. 18) removed to for illustration purposes. The display frame (210) couples to the attachment component (214) via the display fastener (218). In this form, there is one display fastener (218, FIG. 19). In other variations there may be more or less display fasteners (218, FIG. 19) to suit the design requirements. The display fasteners (218, FIG. 19) may be any known fastening device within the art that achieves the design considerations. In this form, the preferred display fastener (218, FIG. 19) is a screw. A biasing element (236) couples to the attachment component (214) via a first fastening element (238) and couples to the display frame (210) via a second fastening element (240). As the vehicle display system (200, FIG. 15) is assembled, a guiding element (not shown), is inserted through the guiding aperture (230) and cooperates with the guiding slot (228) to align the attachment component (214). As the guiding element is maneuvered along the guiding slot (228) the biasing element (236) is compressed. The securing element (234) transitions to engage the stopping surface (232, FIG. 17) of the intermediate adapter (212, FIG. 17). The stopping surface (232) and the biasing element (236) cooperate to lock the attachment component (214) in place, thus securing the display frame (210) to the intermediate adapter (212, FIG. 17).

Figure 20:
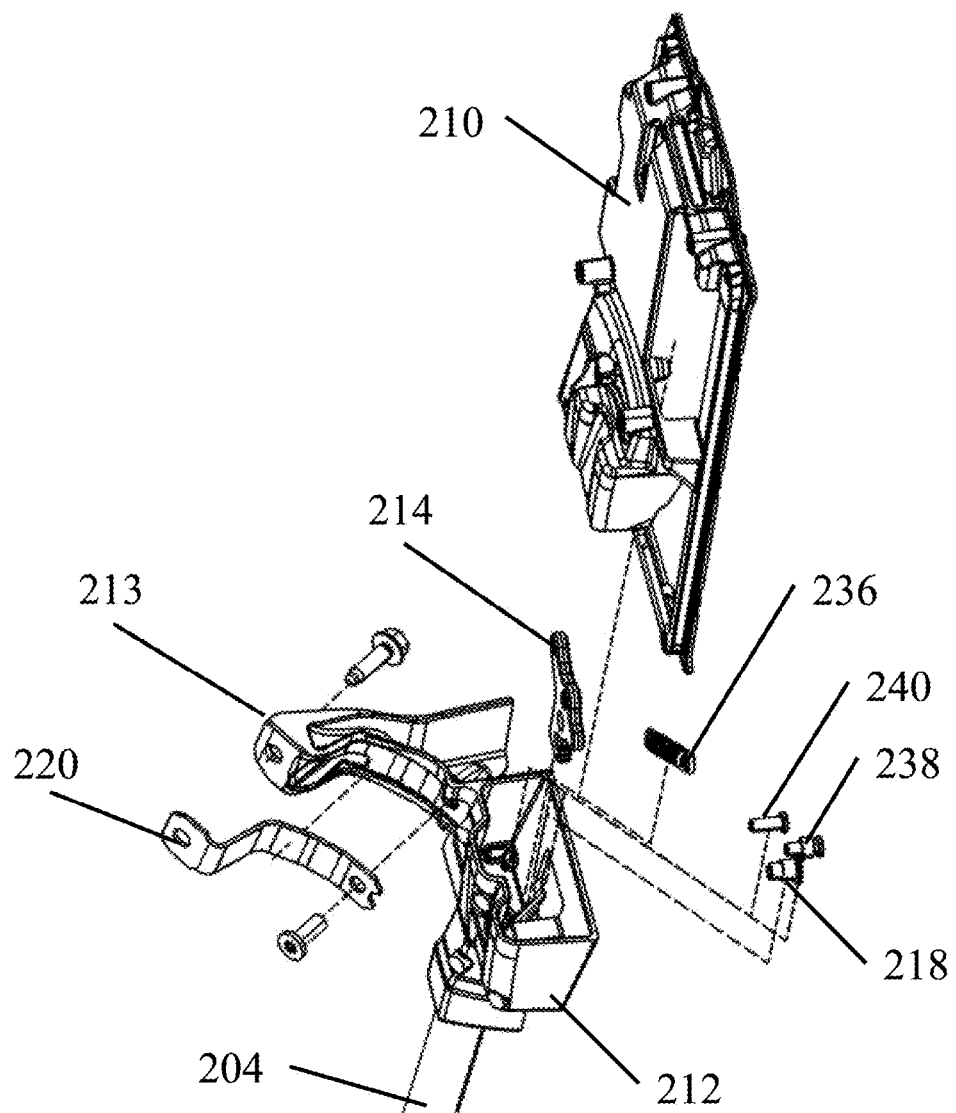
FIG. 20 depicts an exploded view of an alternate variation for a vehicle display retention assembly.

FIG. 20 depicts an exploded view of the alternate variation of the vehicle display retention assembly. This view is intended to show the relationship between the various components within the vehicle display retention system. As shown, and previously stated, the grab bar (204) is coupled to the intermediate adapter (212). The intermediate adapter (212) includes a mounting arm (213). Attached to the mounting arm (213) is a retention strap (220). The retention strap (220) is coupled to the mounting arm (213) at two points. Coupled to the intermediate adapter (212) is the attachment component (214). The biasing element (236) is coupled to the attachment component (214) via the first fastening element (238) and the second fastening element (240). The attachment component (214) is coupled to the display frame (210) via the display fastener (218).

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features disclosed in the foregoing description, in the drawings and in the claims can be essential both individually and in any combination for the implementation of this disclosure in its various embodiments.

REFERENCE SIGN LIST

- 100—Vehicle Display System
- 101—A-Pillar
- 102—Display Unit
- 104—Grab Bar
- 106—First Mounting Member
- 108—Second Mounting Member
- 110—Display Frame
- 111—Rib Member
- 112—Intermediate Adapter
- 113—Mounting Arm
- 114—Attachment Component
- 115—Proximal End
- 116—First Insulating Element
- 116'—Second Insulating Element
- 117—Distal End
- 118—Display Fasteners
- 120—Retention Strap
- 122—Fracture Point
- 124—Retention Member connection Point
- 126—Retention Strap Fastener
- 128—Attachment Component Fastener
- 200—Vehicle Display System
- 202—Display Unit
- 204—Grab Bar
- 206—First Mounting Member
- 208—Second Mounting Member
- 210—Display Frame
- 212—Intermediate Adapter
- 213—Mounting Arm
- 214—Attachment Component
- 218—Display Fastener
- 220—Retention Strap
- 222—Fracture Point
- 224—Retention Member Connection Point
- 225—Mounting Fastener
- 226—Retention Strap Fastener
- 228—Guiding Slot
- 230—Guiding Aperture
- 232—Stopping Surface
- 234—Securing Element
- 236—Biasing Element
- 238—First Fastening Element
- 240—Second Fastening Element
- 1000—Display Unit
- 1040—Display adaptor
- 1080—First Wiring Harness
- 1100—Heat Sink
- 1120—Electronic Control Unit—ECU
- 1140—Shielding Element
- 1160—Second Wiring Harness
- 1180—Third Wiring Harness
- 1200—Light Sensor Cover
- 1220—Light Sensor
- 1240—Light Guide
- 1260—Display Front Surface
- 1340—First Insulating means
- 1360—Second Insulating means
- 1380—Fastener
- 1400—Display Cover
- 1420—Display Housing
- 1460—Display Frame
- 1480—Display
- 1500—Adhesive
- 1520—Display Bezel
- 1540—Mounting Element
- 1560—Aperture
- 1580—Cooling fin
- 2020—Retention Strap
- 2040—Grab Bar
- 2060—Vehicle surface
- 2080—Intermediate Adapter
- 2100—First mounting member
- 2120—Second mounting member
- 2140—Vehicle wiring harness
- 3020—Fastener
- 3060—Connection Member
- 3080—Fastener
- 3100—Aperture
- 4020—Upper Section
- 4040—Lower Section
- 5020—Connector
- 6040—Electrical Connector

The invention claimed is:

1. A vehicle mounted display unit, comprising:
a display frame;
a display attached to the display frame;
an electronic control unit (ECU) attached to the display frame; and
a display adaptor attached to the display frame and acting as an attachment component, the display adaptor having an upper section, a lower section, a first insulating means, and a second insulating means, the upper section configured to be connected to the display frame with the first and second insulating means;
a wire harness,
a display housing;
a display cover attached to the display housing,
an intermediate adapter providing a first mounting member configured to mount to a surface of the vehicle, the lower section of the display adaptor being attached to the intermediate adapter; and
a retention strap attached to the intermediate adapter via a fastening means, wherein the retention strap, in cooperation with the intermediate adapter, is adapted for mounting the display unit to the surface of the vehicle;
wherein the display cover and the wiring harness have two geometric configurations, one for the vehicle mounted display unit to be position left from the driver or passenger and one for the vehicle mounted display unit to be position right from the driver or passenger.

2. The vehicle mounted display unit of claim 1, wherein the display cover and the wiring harness have separate configurations for a LH driving and a RH driving vehicle, and the display housing is adapted to accommodate both the LH and RH driving configurations.

3. The vehicle mounted display unit of claim 1, wherein the vehicle mounted display unit comprises a shielding element, wherein the shielding element is arranged adjacent to the ECU and the display frame includes at least one cooling mean.

4. The vehicle mounted display unit of claim 1, wherein the display is attached to the display frame with at least two fasteners, wherein at least one of the at least two fasteners is located in an interior area of the display and the display frame for additional stiffness and stabilization reducing the stress and forces acting on the display during excessive loading.

5. The vehicle mounted display unit of claim 3, wherein the first and second insulating means are electrically non-conducting, and/or
the first and second insulating means are first and second electrically insulating means.

6. The vehicle mounted display unit of claim 1, wherein the wire harness is connected at a first end to a vehicle wiring harness and at a second end to the display frame,
the wire harness provides a power supply, Controller Area Network communication and/or micro switch signals to the display unit, and
the wire harness provides a ground connected to the ECU and the shielding element.

7. The vehicle mounted display unit of claim 1, wherein the display adaptor is adapted to be a reference point system (RPS) for mounting the vehicle mounted display unit to a vehicle.

8. The vehicle mounted display unit of claim 1, further comprising
a light sensor assembly, wherein the light sensor assembly comprises a light sensor co-operating with a light sensor cover, at least one wiring harness, a light guide, and an electrical connector.

9. The vehicle mounted display unit of claim 8, wherein the light guide comprises a smoked glass,
the light sensor is snap fit connected into the light guide, and
the light sensor assembly is coupled to the display frame.

10. The vehicle mounted display unit of claim 1, further comprising
a heat sink mounted between the display frame and ECU.

11. The vehicle mounted display unit of claim 1, wherein the shielding element comprises an electromagnetic shield (EMC).

12. The vehicle mounted display unit of claim 1, wherein the display adaptor has a Right Hand (RH) driving configuration and a Left Hand (LH) driving configuration, and/or
the display adaptor has a driver configuration and a passenger configuration.

13. The vehicle mounted display unit of claim 1, wherein the display cover is secured by a fastening means on a bottom side of the display housing.

14. The vehicle mounted display unit of claim 1, wherein the display housing in cooperation with the display cover provides sealed cover for interior display components.

15. The vehicle mounted display unit of claim 1, further comprising
a display bezel, wherein an adhesive is used between the display and a display bezel.

16. The vehicle mounted display unit of claim 1, wherein the at least one cooling mean comprises a cooling fin.

17. The vehicle mounted display unit of claim 1, further comprising
a grab bar and a connection member, wherein the grab bar provides a second mounting member for attachment to the vehicle surface, and the connection member couples the intermediate adapter to the grab bar.

18. The vehicle mounted display unit of any one of the claim 1, wherein
the display adaptor is adapted for coupling of the display unit to the intermediate adapter, and
the intermediate adapter is adapted for mounting the display unit to the vehicle surface.

19. The vehicle mounted display unit of any one of the claim 15, wherein
the light sensor attaches to the light sensor cover and is arranged in the light sensor assembly to be visible from outside the display bezel, and
the display bezel has at least one cutout.

20. The vehicle mounted display unit of any one of the claim 8, wherein the light sensor is located behind a translucent part in the display bezel.

21. The vehicle mounted display unit of claim 1, further comprising a display unit affixed to the display frame and connected to a grab bar, wherein the intermediate adapter is coupled to the grab bar, wherein the intermediate adapter comprises a mounting arm for attachment to a vehicle at the first mounting member, and an attachment component coupled to the intermediate adapter, wherein the retention strap is coupled to the mounting arm and the vehicle at the first mounting member.

22. The vehicle mounted display unit of claim 21, wherein the retention strap is coupled to the mounting arm and the vehicle, wherein the retention strap retains the vehicle display retention system in case a fracture point at the mounting arm located between the first mounting member and a retention member connection point fails.

23. The vehicle mounted display unit of claim 21, further comprising a biasing element coupled to the attachment component at a first end and the display frame at a second end.

24. The vehicle mounted display unit of claim 21, wherein the retention strap has a width between 5 mm and 30 mm.

25. A vehicle with at least one vehicle mounted display unit of claim 1.

* * * * *